United States Patent
Martin et al.

(10) Patent No.: US 12,449,124 B2
(45) Date of Patent: Oct. 21, 2025

(54) METHOD AND DEVICE TO REDUCE EMISSIONS OF NITROGEN OXIDES AND INCREASE HEAT TRANSFER IN FIRED PROCESS HEATERS

(71) Applicant: XRG Technologies, LLC, Tulsa, OK (US)

(72) Inventors: Matthew Martin, Tulsa, OK (US); Erwin Platvoet, Owasso, OK (US)

(73) Assignee: XRG Technologies, LLC, Tulsa, OK (US)

( * ) Notice: Subject to any disclaimer, the term of this patent is extended or adjusted under 35 U.S.C. 154(b) by 767 days.

(21) Appl. No.: 17/716,307

(22) Filed: Apr. 8, 2022

(65) Prior Publication Data
US 2023/0151959 A1 May 18, 2023

Related U.S. Application Data

(63) Continuation-in-part of application No. 16/806,578, filed on Mar. 2, 2020, now Pat. No. 11,927,345.

(60) Provisional application No. 62/812,478, filed on Mar. 1, 2019.

(51) Int. Cl.
*F23D 14/64* (2006.01)
*F23D 14/12* (2006.01)
*F23D 14/68* (2006.01)

(52) U.S. Cl.
CPC ............. *F23D 14/64* (2013.01); *F23D 14/12* (2013.01); *F23D 14/68* (2013.01); *F23D 2203/002* (2013.01); *F23D 2208/10* (2013.01)

(58) Field of Classification Search
None
See application file for complete search history.

(56) References Cited

U.S. PATENT DOCUMENTS

| | | | |
|---|---|---|---|
| 3,582,053 A | 6/1971 | Limpach |
| 3,807,321 A | 4/1974 | Stockman |
| 4,296,921 A | 10/1981 | Hayashi |
| 4,886,446 A | 12/1989 | Courrege |

(Continued)

FOREIGN PATENT DOCUMENTS

| | | | |
|---|---|---|---|
| CN | 104190184 A | 12/2014 |
| DE | 3313567 A1 | 4/1984 |

(Continued)

OTHER PUBLICATIONS

International Search Report and Written Opinion PCT/US2023/061912 dated Jul. 14, 2023.

(Continued)

*Primary Examiner* — Jason Lau
(74) *Attorney, Agent, or Firm* — Crowe & Dunlevy, P.C.

(57) ABSTRACT

A method and assembly for supplying heat in the desired pattern while suppressing the production of nitrogen oxides and carbon dioxide. The assembly includes a fluid mixture nozzle assembly in fluid communication with an external conduit and a radiant section of a fired process heater. The fluid mixture nozzle assembly includes an open mixing channel having an upstream converging section, a midstream mixing section, and a downstream diverging section for entraining a fluid mixture with vitiated flue gas combustion products. The fluid mixture nozzle assembly is installed in the wall, floor, or ceiling of the fired heater.

21 Claims, 27 Drawing Sheets

(56) References Cited

U.S. PATENT DOCUMENTS

| | | |
|---|---|---|
| 4,995,807 A | 2/1991 | Rampley et al. |
| 5,135,387 A | 8/1992 | Martin et al. |
| 5,165,884 A | 11/1992 | Martin et al. |
| 5,316,469 A | 5/1994 | Martin et al. |
| 6,015,540 A | 1/2000 | McAdams et al. |
| 6,065,956 A | 5/2000 | Cornil et al. |
| 6,383,461 B1 | 5/2002 | Lang |
| 6,383,462 B1 | 5/2002 | Lang |
| 6,609,907 B1 | 8/2003 | Wood et al. |
| 6,796,789 B1 | 9/2004 | Gibson et al. |
| 7,153,129 B2 | 12/2006 | Bussman et al. |
| 7,172,412 B2 | 2/2007 | Platvoet et al. |
| 8,408,896 B2 | 4/2013 | Ponzi et al. |
| 2003/0234009 A1 | 12/2003 | Kennedy et al. |
| 2005/0061378 A1 | 3/2005 | Foret |
| 2013/0283852 A1 | 10/2013 | Sipoecz et al. |
| 2017/0120290 A1* | 5/2017 | Marshall .................. B05D 1/12 |
| 2017/0336123 A1 | 11/2017 | Dodson |
| 2018/0080647 A1 | 3/2018 | Abbasi et al. |

FOREIGN PATENT DOCUMENTS

| | | |
|---|---|---|
| ES | 245648 Y | 11/1980 |
| GB | 1259351 A | 1/1972 |
| IN | 207340 B | 7/2007 |
| JP | 2000065316 A | 3/2000 |
| JP | 2005231984 A | 9/2005 |
| WO | 0169132 A1 | 9/2001 |
| WO | 2010036372 A1 | 4/2010 |

OTHER PUBLICATIONS

Non-Final Office Action dated May 17, 2022 in corresponding U.S. Appl. No. 16/806,578.

Final Office Action dated Oct. 31, 2022 in corresponding U.S. Appl. No. 16/806,578.

He, Yu, "Flameless Combustion of Natural Gas in the SJ/WJ Furnace", Apr. 2008, pp. 1-213 Publisher: Queens University, Kingston, Ontario, Canada.

Wunning, J, "Flameless Oxidation", Oct. 17-19, 2005, Publisher: 6th HITACG Symposium—2005, pp. 1-13, Essen, Germany.

* cited by examiner

METHOD AND DEVICE TO REDUCE EMISSIONS OF NITROGEN OXIDES AND INCREASE HEAT TRANSFER IN FIRED PROCESS HEATERS

CROSS-REFERENCE TO RELATED APPLICATIONS

This application is a continuation-in-part and claims priority to U.S. patent application Ser. No. 16/806,578 filed Mar. 2, 2020, which claims the benefit of U.S. Provisional Patent Application No. 62/812,478 filed on Mar. 1, 2019, and incorporates each of said applications by reference in its entirety into this document as if fully set out at this point.

BACKGROUND OF THE INVENTION

1. Field of the Invention

This invention relates generally to a heating method and assembly in which combustion occurs in a vitiated oxygen atmosphere, suppressing the maximum temperature rise resulting from the reactions, and more particularly to a method and assembly for supplying heat in a desired pattern in a fired process heater while suppressing the production of nitrogen oxides and carbon dioxide.

2. Description of the Related Art

Fired heaters and boilers use burners to generate heat from flames. Radiation and convection heat transfer from the flame is used heat to metal tubes or pipes containing a process fluid. The process fluid is typically a mixture of hydrocarbons or water. Flames create a rapid increase in temperature which in turn has multiple undesirable effects.

High-temperature combustion in flames creates the harmful chemical nitrogen oxides ($NO_x$). The high temperature of flames creates local high-temperature regions on the tubes, which may both oxidize them and result in stress greater than that which the tube can withstand, particularly when under pressure from the process fluid. Local heating of the process fluid can cause undesired reactions in the case of hydrocarbon feed and fouling for both hydrocarbons and boiler feed water.

The bulk of the heat is transferred through irradiation of the tubes. When process tubes are mounted next to a wall and the flames only radiate from one side, the surface area available to transfer heat is limited principally to the flame-facing side. Even when flames are present on both sides of a series of tubes the shadow from the adjacent tube limits the surface area that can be used to transfer heat. Much of the tube surface area is not fully utilized, limiting the heating that can be achieved.

It is desirable to provide heat to process tubes without producing $NO_x$, without causing undesired reactions in the process fluid, without oxidizing or fouling the tubes, and without underutilizing the tube surface area. A variety of technologies are available that address these issues individually, but these technologies do not address the root cause, which is the locally high temperature caused by flames. Novel technology to produce heat by combustion without a flame is disclosed herein that lowers the overall temperature of the fired heater firebox, thereby reducing the formation of $NO_x$ and lowering tube temperatures while increasing the utilization of the coil surface area.

Fuel, oxidant, and inert fluid must first be in the correct state to release heat without flame. When mixed with air, typical fuels with practical use in combustion systems do not reach the required state. The fuel/air mixture will either form flame or not combust. To move the reactant mixture to the required state, it must be preheated and diluted. Some systems preheat the fuel and/or air and then perform dilution within a combustion chamber by mixing the reactants with combustion products. Some systems, such as the one disclosed here, instead preheat and dilute the reactants simultaneously by mixing them with relatively inert hot combustion products using a properly designed mixing device.

Fluid jets will entrain surrounding quiescent fluid because increased fluid velocity reduces the static pressure of the moving fluid. Turbulent round jets expand and dissipate as the axial dimension away from the jet nozzle increases. This jet spread corresponds with both a reduction in velocity along the axis of the fluid jet and mixing with the surrounding fluid. Therefore, a single high-velocity jet will both entrain and mix with the surrounding atmosphere fluid. Maximum secondary fluid entrainment would theoretically occur from an unconstrained primary fluid jet because all momentum from the high-velocity jet would be imparted to the surrounding fluid without additional dissipation from turbulence generated in the boundary layer near any constraining solid surfaces. Maximizing entrainment of vitiated combustion products with the fuel and air helps to ensure that the reactants are preheated and diluted so that flameless oxidation of the fuel may occur.

However, maximum entrainment is not the only consideration for successful conditioning of the reactants. If the reactants combust before they are mixed to the correct state, then flame may form or the reactions may not proceed. If the reactions proceed more quickly than the dissipation of the relatively unmixed core of the fuel jet flow, the undiluted fuel will be consumed by the reactions prematurely without dilution rather than being diluted by mixing. Minimizing the mixing length of reactants is therefore desirable to ensure that the reactants are preheated and dilute before combustion. Calculations from round jet theory show that dissipating the velocity from a 5 mm sonic nozzle to a typical fired heater plug flow velocity of 1.5 m/s would require 7 m of mixing length. Many fired heaters are approximately 7 m in height. The mixing distance may be even greater when there is co-flowing flue gas.

While the fluid jet of fuel mixes with the surrounding atmosphere, it is also required that the jet speed remains above the flame speed of the fuel, or flame may form before the fuel is diluted. In a typical premixed combustion device, the fuel is injected with high pressure into a venturi eductor where it is mixed inside a tube with air or vitiated combustion products. The disadvantages of this method of mixing are multiple. If a flame forms inside the mixer, it may reside there indefinitely, reducing further entrainment and increasing the local temperature until mechanical failure. If a smaller diameter eductor throat is used to increase mixing and velocity, the reduced intake area limits the entrainment in the nearfield of the primary fluid jet where the highest entrainment is expected. If a larger diameter throat is used to increase entrained secondary fluid the resulting reduced velocity limits the nearfield mixing of the primary and secondary fluid.

A larger orifice in the fuel nozzle reduces the number of nozzles required for a fixed flow rate and decreases the propensity for the orifices to plug with debris. This requirement precludes using extremely small orifices to reduce the mixing length from the fluid jets issuing from the nozzles. Even if filters are used to ensure no large particles enter the fuel nozzles, the cost of installing many small nozzles would be prohibitive to most practical applications. Therefore, it is preferable to have a mixing device placed downstream of the fluid jet entry to dissipate a smaller number of jets rather than to use a larger number of round jets without a mixing device.

A fluid jet near a wall will adhere to that wall. For a round free jet, this means that unless the jet is placed sufficiently far from a wall, it will not behave as a free jet and instead have the entrainment reduced. This feature of fluid jets can also be used to direct the jet momentum well after the jet nozzle exit. In practical systems, a wall may be eroded by the impinging high-velocity jet. If a fluid jet is to remain near a wall it should also have the velocity magnitude reduced such that the jet impingement velocity does not erode the wall.

To ensure the state of the mixture issuing into a combustion chamber will not be predisposed to form flame it is novel and advantageous to first premix a portion of the fuel in a conduit that is separate from the combustion chamber. Mixing in a vessel or conduit that is separated from the combustion chamber allows for metered mixing of the flue gas and the fuel. The fuel and flue gas mixture are more uniformly mixed, has a higher lower flammability limit, and a lower adiabatic flame temperature before it is introduced into the combustion chamber where it may potentially be exposed to oxygen and temperature such that a flame is formed.

FIG. 1 shows the normalized measures from mixtures of methane fuel and flue gas at 15% excess air and 1144 K. The y-axis 10 shows the scale of the calculated measure normalized to the measure calculated with undiluted fuel gas. The x-axis 12 shows the scale for the mass of flue gas normalized by the mass of fuel gas. When increasing the mass flue gas mixed with the fuel from 0 to 9, the flame temperature decreases by 10% 13. Thermal $NO_x$ production is exponentially dependent on flame temperature. Over the same range the thermal $NO_x$ 14 decreases by 60%. Over the same range, the lower flammability limit 15 increases by 140%.

It is therefore desirable to provide a method and assembly for supplying heat in the desired pattern while suppressing the formation of flame to decrease $NO_x$, increase temperature uniformity, and increase the utilization of the coil surface area to maximum heat flux. The requirement that the local concentration of the mixed fuel is greater aids to suppress the formation of flame.

Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

In general, in a first aspect, the invention relates to a fluid mixture nozzle assembly having a mixture nozzle assembly body having an open mixing channel. The open mixing channel includes an upstream converging section, a midstream mixing section, and a downstream diverging section. The open mixing channel is configured to mix and entrain a primary fluid mixture with a secondary fluid mixture. The converging section has a primary fluid jet positioned therein and has a primary jet injection axis along a length of the open mixing channel. The primary fluid jet is configured to inject the primary fluid mixture into the open mixing channel, and the converging section has a contracting shape configured to entrain and mix the primary fluid mixture with the secondary fluid mixture. The mixing section has neither a contracting shape nor an expanding shape, and the mixing section has a throat dimension configured to constrain an amount of the secondary fluid mixture entrained and mixed with the primary fluid mixture. The diverging section has an expansion shape configured to entrain the secondary fluid mixture with the primary fluid mixture. In addition, the open mixing channel includes a curved lower, jet impingement surface positioned downstream of the primary fluid jet in the converging section. The jet impingement surface and the diverging section are configured to shape the entrained and mixed primary and secondary fluid mixtures into a principally planar jet at an exit of the diverging section.

In general, in a second aspect, the invention relates to an assembly for reducing emissions of nitrogen oxides and for increasing heat transfer in a fired process heater. The fired process heater has a radiant section having a plurality of process tubes and a burner. The assembly has a fluid mixture nozzle assembly configured to be installed in fluid communication with the radiant section of the fired heater, and the fluid mixture nozzle assembly is positioned at a location remote from the burner of the fired heater. The assembly also has an external fluid conduit in fluid communication with the fluid mixture nozzle assembly and with the radiant section of the fired process heater.

The fluid mixture nozzle assembly has an open mixing channel having an upstream converging section, a midstream mixing section, and a downstream diverging section. The open mixing channel is configured to mix and entrain a primary fluid mixture with a secondary fluid mixture, and the converging section has a contracting shape configured to entrain and mix the primary fluid mixture with the secondary fluid mixture. The mixing section has a throat dimension configured to constrain an amount of the secondary fluid mixture entrained and mixed with the primary fluid mixture. The diverging section has an expansion shape configured to entrain the secondary fluid mixture with the primary fluid mixture. A primary fluid jet is positioned in the converging section and has a primary jet injection axis along a length of the open mixing channel. The primary fluid jet is configured to inject the primary fluid mixture into the open mixing channel. A curved lower, jet impingement surface is positioned downstream of the primary fluid jet in the converging section, and the jet impingement surface and the diverging section are configured to shape the entrained and mixed primary and secondary fluid mixtures into a principally planar jet at an exit of the diverging section.

The fluid mixture nozzle assembly may be configured to inject the primary fluid mixture at a target rate. The fluid mixture nozzle assembly can be installed in fluid communication with the radiant section of the fired heater, such as at a location removed from a location of the burner installed in the radiant section of the fired heater. The fluid mixture nozzle assembly can also be positioned externally from the radiant section, separated from the radiant section by an exterior heater wall, and positioned remote from the burner of the fired heater.

The primary fluid jet can inject the primary fluid mixture into the open mixing channel at a pressure greater than the secondary fluid mixture. The primary fluid mixture can be a mixture of fuel gas and flue gas, and the secondary fluid mixture can be vitiated atmospheric flue gas within the fired heater.

The assembly can also include an external fluid conduit in fluid communication with the fluid mixture nozzle assembly body. The conduit may be positioned externally from the radiant section, separated from the radiant section by an exterior heater wall, and positioned remote from the burner of the fired heater. The conduit can include a fluid outlet, a fluid inlet, and a fluid flow path intermediate of the fluid inlet and the fluid outlet. The conduit may be configured to attach to the fluid mixture nozzle assembly body and the fired process heater such that the conduit fluid flow path is in fluid communication with the radiant section of the fired process heater.

In addition, the conduit can include a flue gas entrainment unit. The flue gas entrainment unit can include an inlet section of reducing diameter, a mixing section of constant diameter, and an exit section of expanding diameter; a fuel injector configured to issue fuel at subsonic, sonic, or supersonic velocity into the entrainment unit fluid flow path; and ductwork comprising a fluid outlet, a fluid inlet and a fluid flow path intermediate of the fluid inlet and the fluid outlet. The ductwork fluid outlet can be connected to the entrainment unit fluid inlet such that the ductwork fluid flow path is in fluid communication with the entrainment unit flow path. The ductwork fluid inlet can be configured to attach to the fired process heater such that the ductwork fluid flow path is in fluid communication with the radiant section of the fired process heater.

The flue gas entrainment unit can also include a fluid injector configured to issue a reagent fluid at subsonic, sonic, or supersonic velocity into the entrainment unit fluid flow path. The reagent fluid may be steam, ammonia, urea, or a mixture thereof. Additionally, the entrainment unit can include a thermocouple downstream of the fuel injector, a zirconia oxygen sensor downstream of the fuel injector, a tunable diode laser downstream of the fuel injector, a hot-wire anemometer, or a combination thereof.

The assembly may also have a venturi eductor configured to attach to the entrainment unit fluid outlet and further configured to attach to the fired process heater. The venturi eductor can have a fluid outlet, a fluid inlet, and a fluid flow path intermediate of the fluid inlet and the fluid outlet, and the venturi eductor fluid inlet can be connected to the entrainment unit fluid outlet such that the venturi eductor fluid flow path is in fluid communication with the entrainment unit flow path. Moreover, the venturi eductor can be configured to use a secondary fluid, such as steam, to increase the fluid flow through the flue gas entrainment unit. The venturi eductor may have an inlet section of reducing diameter, a mixing section of constant diameter, and an exit section of expanding diameter, and the venturi eductor can also have a fluid injector configured to issue a reagent fluid at subsonic, sonic, or supersonic velocity into the fluid flow path of the venturi eductor.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting unless the specification specifically so limits the invention.

BRIEF DESCRIPTION OF THE DRAWINGS

These and further aspects of the invention are described in detail in the following examples and accompanying drawings.

DETAILED DESCRIPTION OF THE INVENTION

Figure 1:
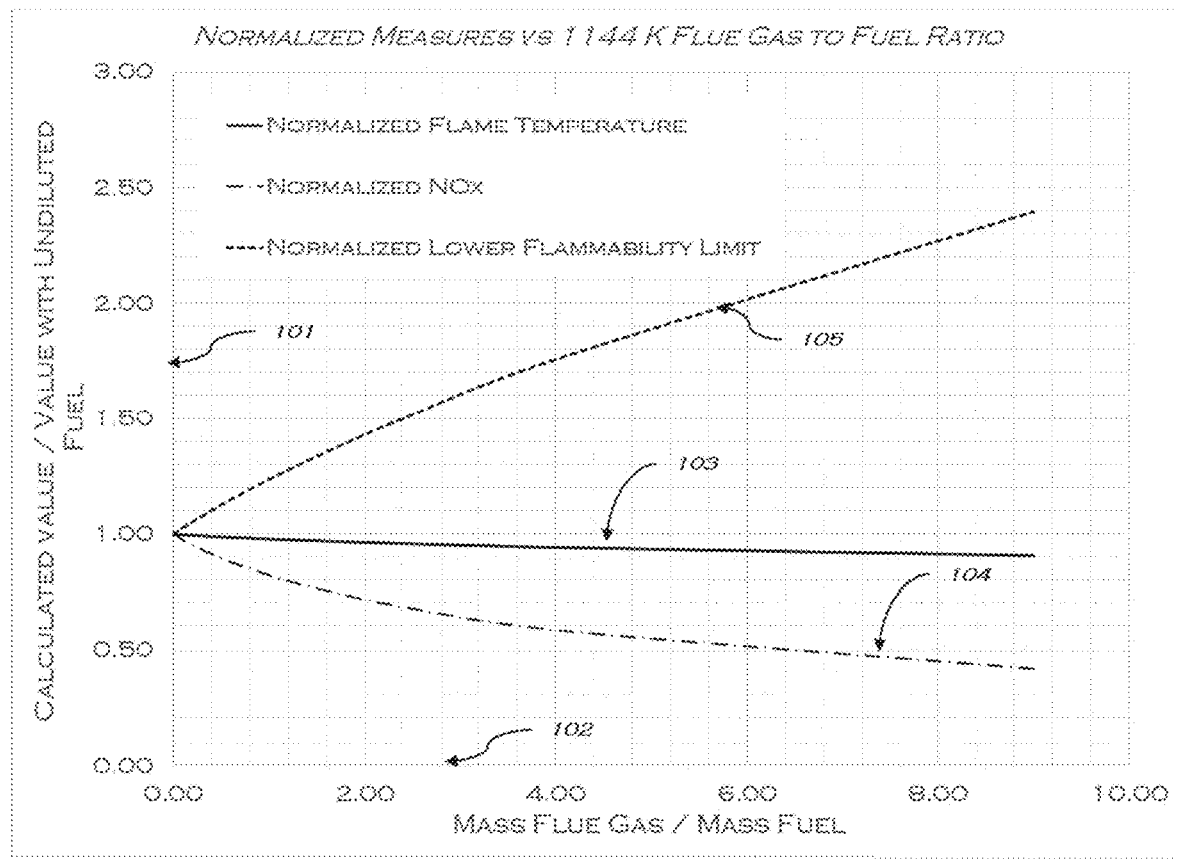
FIG. 1 is a graphical representation of normalized fluid properties resulting from mixing fuel with flue gas.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments so described.

The invention is generally directed to a heating method and assembly in which combustion occurs in a vitiated oxygen atmosphere, suppressing the maximum temperature rise resulting from the reactions. The inventive method and assembly supply heat to a radiant section or firebox 102 of a fired process heater 100 in a desired pattern to suppress the production of nitrogen oxides and carbon dioxide. In particular, the method and assembly include a fluid mixture nozzle assembly 200 that utilizes a mixture of fuel gas and flue gas as a lean combustible, primary fluid mixture 203. The fluid mixture nozzle assembly 200 injects the primary fluid mixture 203 into the radiant section 102 where the primary fluid mixture 203 entrains with a secondary fluid mixture of vitiated atmospheric flue gas 204 within the fired heater 100 to decrease $NO_x$ and CO production during combustion.

Figure 2:
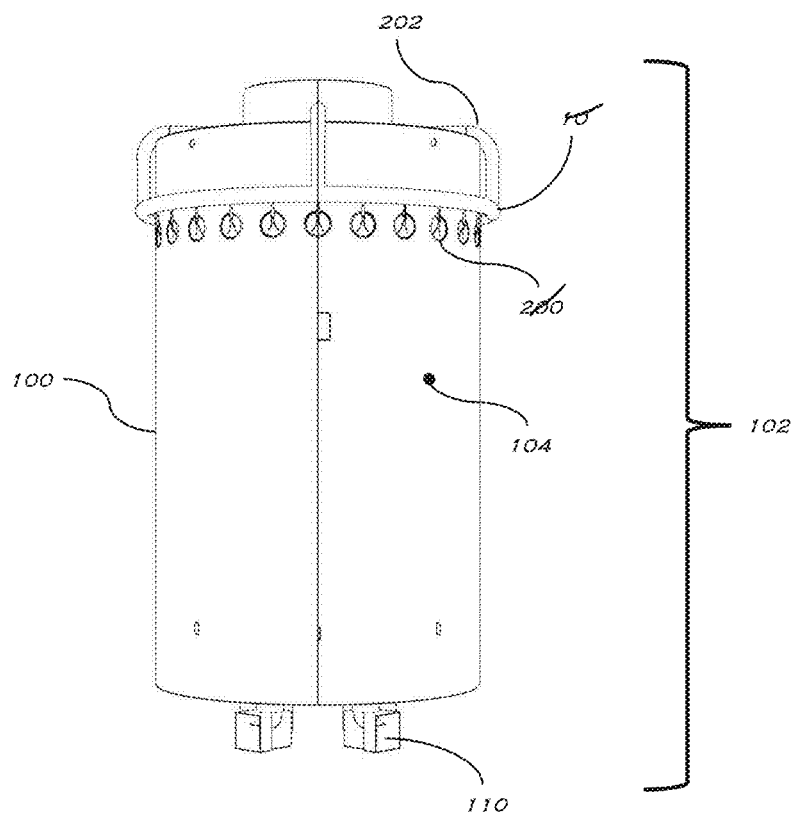
FIG. 2 is an elevation view of an example of an external fluid conduit and a fluid mixture nozzle assembly installed in a vertical cylindrical fired heater in accordance with an illustrative embodiment of the invention disclosed herein.

FIG. 2 illustrates the radiant section 102 of the fired heater 100 having a plurality of fluid mixture nozzle assemblies 200 positioned at locations remote 202 from an ultra-low $NO_x$ or other burner(s) 110. The fluid mixture nozzle assemblies 200 inject the primary fluid mixture 203 into the firebox or radiant section 102 for combustion with the oxidant burner(s) 110. A conduit 10 is connected to and/or in fluid communication with each of the fluid mixture nozzle assemblies 200, and the primary fluid mixture 203 in the external conduit 10 flows to the fluid mixture nozzle assemblies 200 where it is injected into the radiant section 102 of the fired heater 100.

The fluid mixture nozzle assembly 200 and the conduit 10 are positioned externally from the radiant section 102, separated from the firebox 102 by an exterior heater wall 104, and positioned remote 202 from the burner(s) 110 of the fired heater 100. An opening 106 is cut through the exterior heater wall, floor, or ceiling 104 of the fired process heater 100 of effectively the same diameter as the fluid mixture nozzle assembly 200, and the fluid mixture nozzle assembly 200 attaches to the exterior heater wall, floor, or ceiling 104 using bolts, welding, or any mechanically suitable fastener. Flue gas is educed from the firebox 102 through a flue gas outlet 15 and flows into ductwork 14 where it is mixed with fuel gas within the conduit 10 before being delivered as the primary fluid mixture 203 to the fluid mixture nozzle assembly 200.

Figure 3:
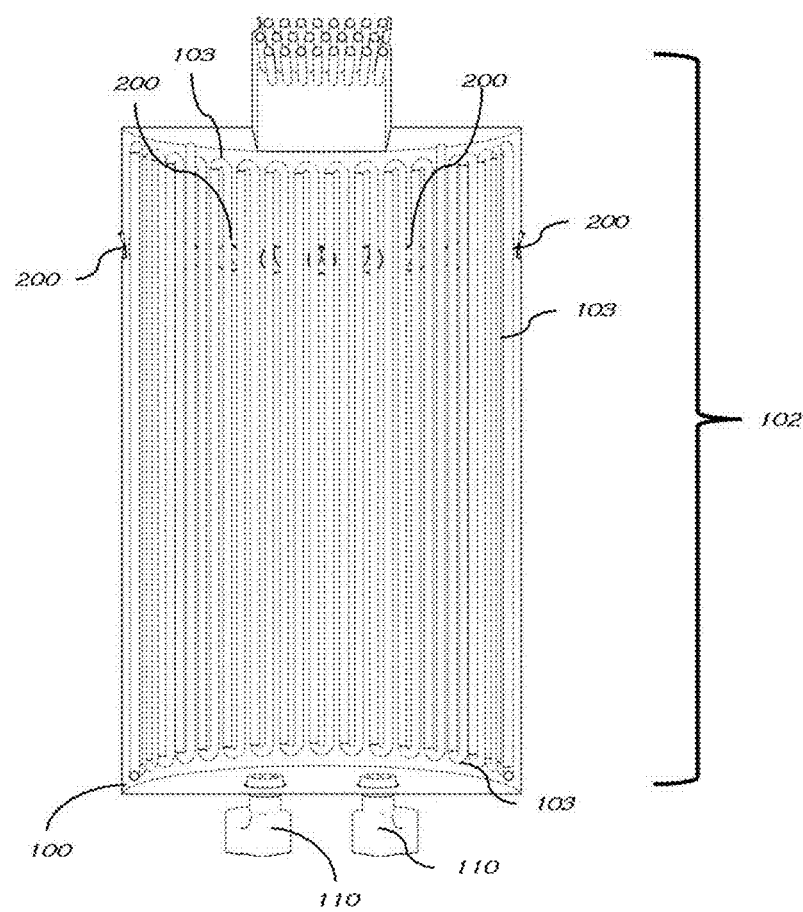
FIG. 3 is a cross-sectional view of the fired heater shown in FIG. 2 having a plurality of mixing nozzle assemblies disposed within a radiant section of the fired heater in accordance with an illustrative embodiment of the invention disclosed herein.
Figure 4:
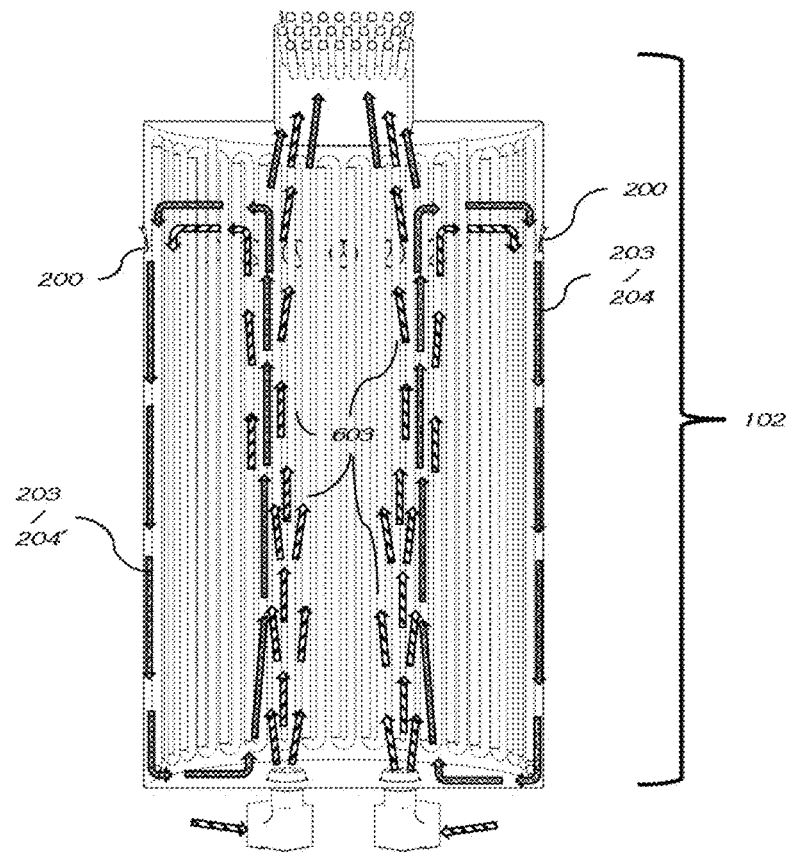
FIG. 4 is a cross-sectional view of FIG. 3 illustrating the mean path of a primary fluid injected into the fired heater by the mixing nozzle assemblies disclosed herein.
Figure 5:
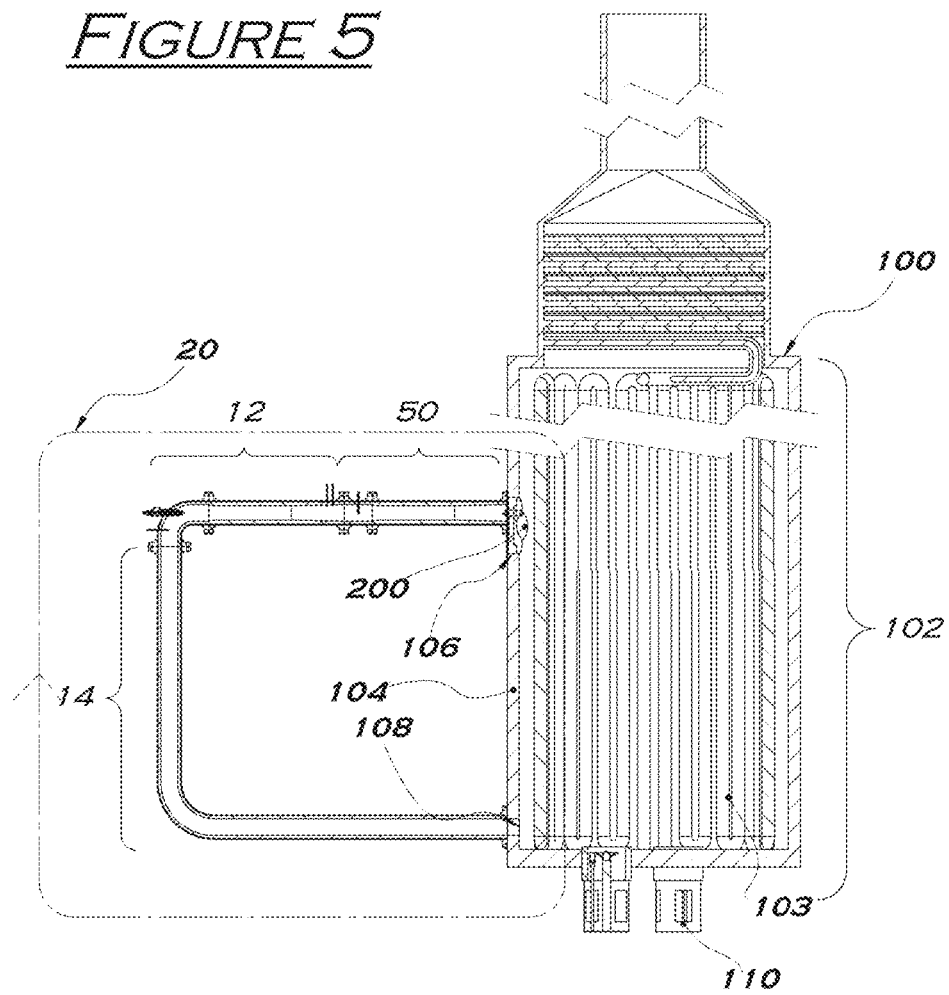
FIG. 5 is another cross-sectional view of the fired heater shown in FIG. 2 having a plurality of mixing nozzle assemblies disposed within a radiant section of the fired heater and in fluid communication with a flue gas entrainment assembly in accordance with another illustrative embodiment of the invention disclosed herein.

As can be seen in FIGS. 3 and 4, the fired heater 100 has the fluid mixture nozzle assemblies 200 installed in the wall 104 behind a coil 103, which is used to transfer heat away from the combustion products into the process fluid flowing through the coil 103. It is understood by those skilled in the art that fired process heaters have a variety of designs and the fluid mixture nozzle assemblies 200 can be installed at any available advantageous location on the wall, floor, ceiling, or otherwise of the fired heater 100 that is remote from the oxidant delivery burner(s) 110. FIG. 4 illustrates the flow path of the primary fluid mixture 203 injected into the fired heater 100 from the fluid mixture nozzle assemblies 200, and as can be seen, the distance the primary fluid mixture 203 and the entrained secondary fluid mixture 204 travel before reaching the input of the air oxidant from the burner(s) 110 both increases the mixing time as well as allows the heat to be removed more slowly from the coil 103 surface.

Referring now to FIGS. 6 through 9, the conduit 10 can be configured for flue gas preconditioning to further reduce emissions of nitrogen oxides and to further increase heat transfer in the fired process heater 100. As exemplified for flue gas preconditioning, the conduit 10 can include one or more flue gas entrainment units 12 that are attached to the radiant section or firebox 102 of the fired process heater 100. The conduit 10, or if present, the flue gas entrainment unit 12, attaches to the fluid mixture nozzle assemblies 200 using bolting, welding, or any mechanically suitable fastener. A length of ductwork 14 may be placed between a fluid outlet 16 of the entrainment unit 12 and the fluid mixture nozzle assembly 200. A second opening 108 is cut through the exterior heater wall, floor, or ceiling 104. From the second opening 108, the ductwork 14 attaches to an upstream fluid inlet 18 of the flue gas entrainment unit 12. The ductwork 14 may have an internal lining of refractory material encased in steel or have an internal high-temperature steel lining with external installation. The conduit 10 makes a closed circuit 20 with respect to flue gas from the radiant section 102 of the fired heater 100 and allows for the injection of the primary fluid mixture 203 from the fluid mixture nozzle assemblies 200.

Figure 6:
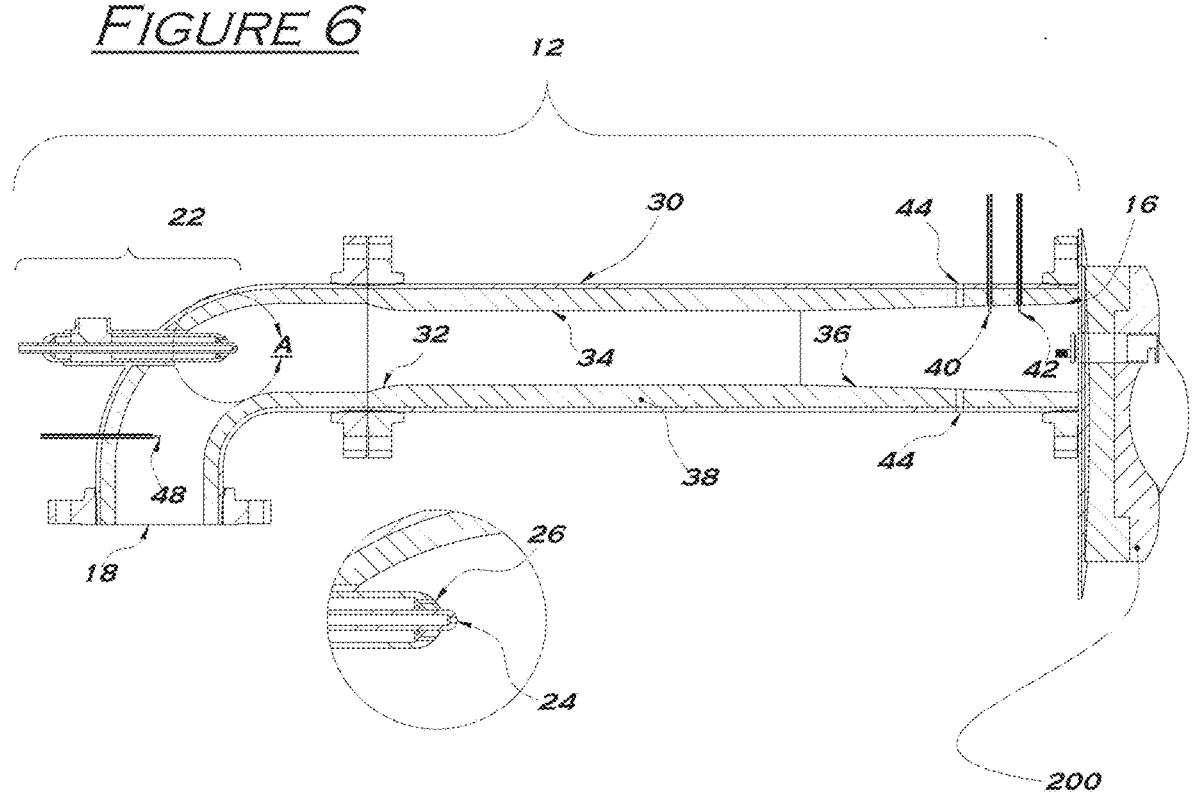
FIG. 6 is a cross-sectional view of the flue gas entrainment unit of FIG. 5.

In FIG. 6, the flue gas entrainment unit 12 is illustrated as having a primary fuel gas injector 22 with a nozzle 24 from which a fuel gas issues at subsonic, sonic, or supersonic velocity. The flue gas entrainment unit 12 may also include a flue gas preconditioning fluid injector 26 with a nozzle from which a flue gas preconditioning fluid issues at subsonic, sonic, or supersonic velocity. The flue gas preconditioning fluid can be either steam and a diluent and motive fluid or ammonia or urea as a reagent for selective non-catalytic reactions with any oxides of nitrogen that are present in the flue gas of the fired heater 100.

A section 30 of the entrainment unit 12 can have interior dimensions that produce an inlet section of reducing diameter 32, a mixing section of constant diameter 34, and an exit section of expanding diameter 36. The flue gas entrainment unit 12 may be constructed with an interior core of heat resistant material 38, such as a refractory ceramic oxide, and an exterior casing of steel. Alternatively, the entrainment unit 12 may be constructed with an interior of heat-resistant steel encased with external insulation. The conduit 10 may contain a thermocouple 40 downstream of the fuel injector 22. In addition, the conduit 10 may include a zirconia oxygen sensor 42 and/or two ports 44 for access by a tunable diode laser 46. The conduit 10 may also contain a hot-wire anemometer 48.

Figure 7:
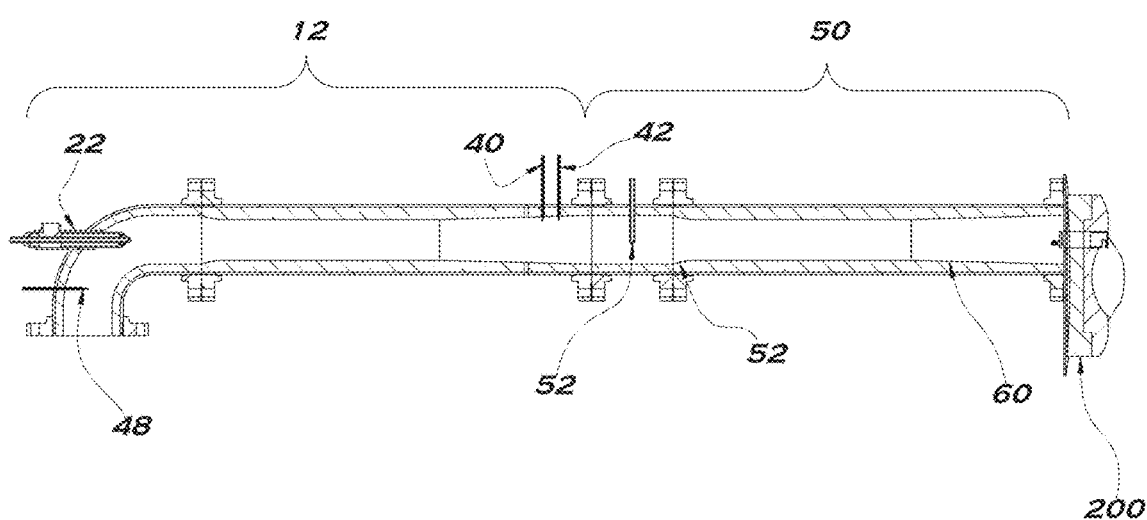
FIG. 7 is a cross-sectional view of the flue gas entrainment unit of FIG. 5 connected to a venturi eductor in accordance with another illustrative embodiment of the invention disclosed herein.

As shown in FIG. 7, the conduit 10 can also include a venturi eductor 50 using a secondary flue gas preconditioning fluid, such as steam, as the high-pressure motive force fluid can be placed between the fluid outlet 16 of the flue gas entrainment unit 12 and the fluid mixture nozzle assembly 200 such that venturi eductor 50 can be used to increase the pressure differential between the upstream 18 and downstream side 16 of the flue gas entrainment unit 12, thus increasing the flow through the flue gas entrainment unit 12 and to the fluid mixture nozzle assembly 200. A section 54 of the venturi eductor 50 has interior dimensions that produce an inlet section of reducing diameter 56, a mixing section of constant diameter 58, and an exit section of expanding diameter 60. A tertiary flue gas preconditioning fluid injector 52 can be used to inject steam, ammonia, or urea as a reagent for selective non-catalytic reactions with any oxides of nitrogen that are present in the flue gas of the fired heater 100.

Turning now to FIGS. 8A through 8I, the inventive method and assembly disclosed herein deliver the primary fluid mixture 203 (which may or may not include flue gas preconditioning depending upon the installation) into the fired heater 100 using the fluid mixture nozzle assemblies 200 at locations removed 202 from the location of the oxidant delivery 110. Each of the fluid mixture nozzle assemblies 200 has a nozzle assembly body 201 that is configured to mix the primary fluid mixture 203 with the secondary vitiated flue gas 204 in the radiant section 102 of the fired heater 100 to suppress the formation of flame from the burner(s) 110.

Figure 8A:
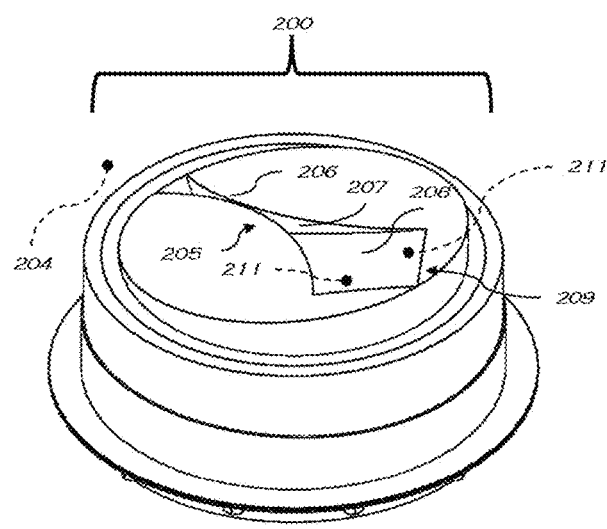
FIG. 8A is a perspective view of an example of a fluid mixture nozzle assembly for installation in a fired heater in accordance with an illustrative embodiment of the invention disclosed herein.
Figure 8B:
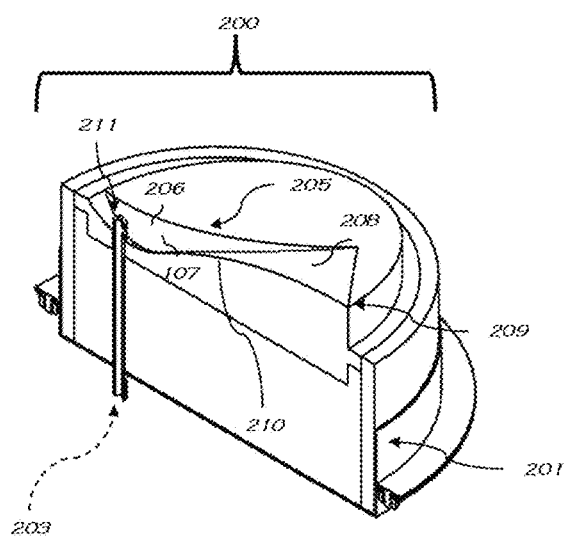
FIG. 8B is a cross-sectional view of the fluid mixture nozzle assembly shown in FIG. 8A.
Figure 8C:
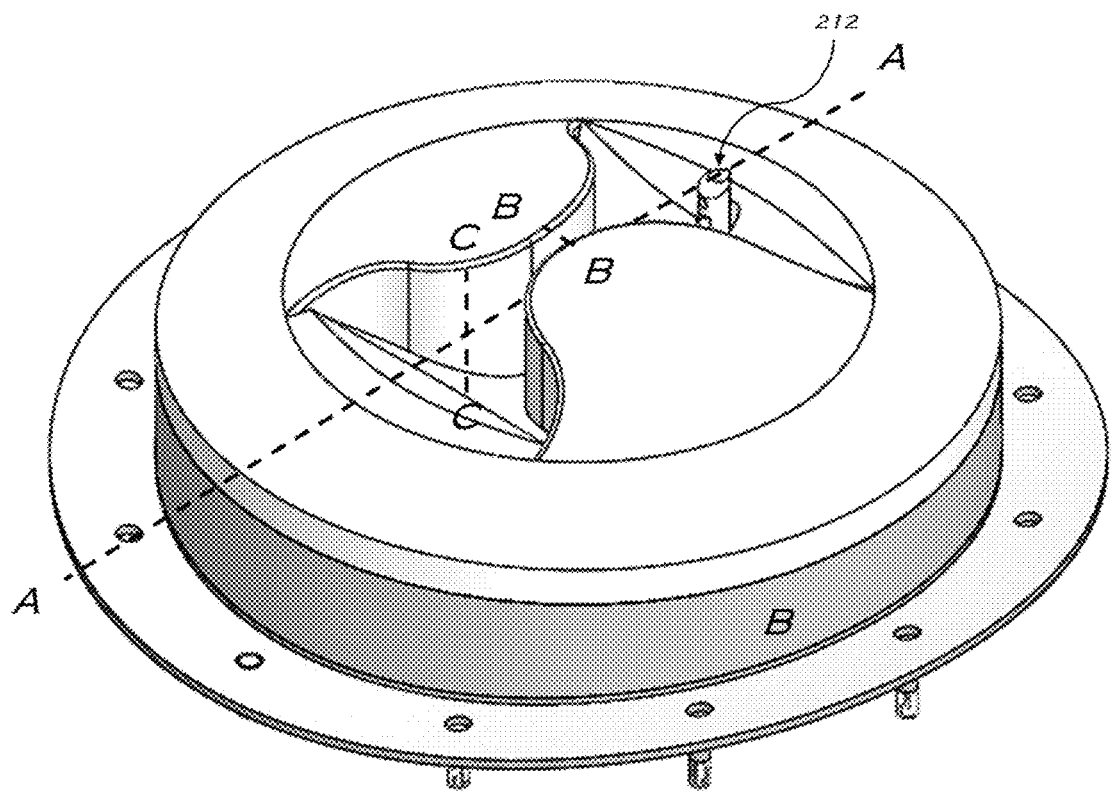
FIG. 8C is another perspective view of an example of a fluid mixture nozzle assembly for installation in a fired heater in accordance with an illustrative embodiment of the invention disclosed herein.
Figure 8D:
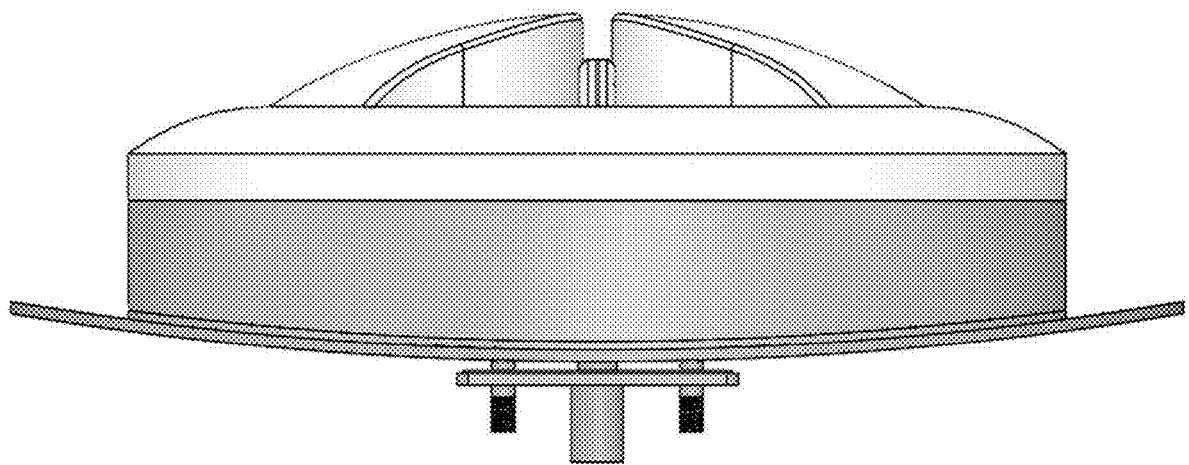
FIG. 8D is a front elevation view of the fluid mixture nozzle assembly shown in FIG. 8C.
Figure 8E:
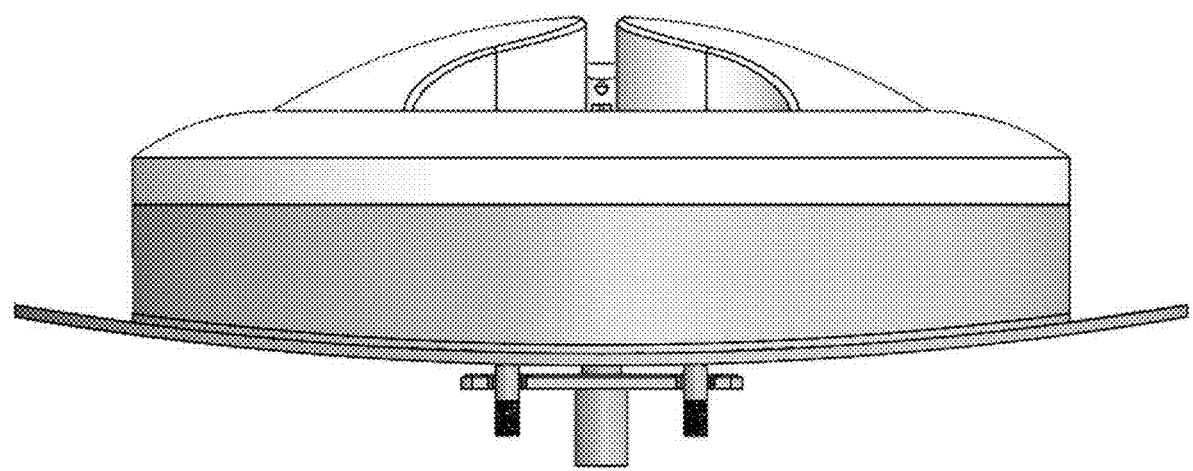
FIG. 8E is a rear elevation view of the fluid mixture nozzle assembly shown in FIG. 8C.
Figure 8F:
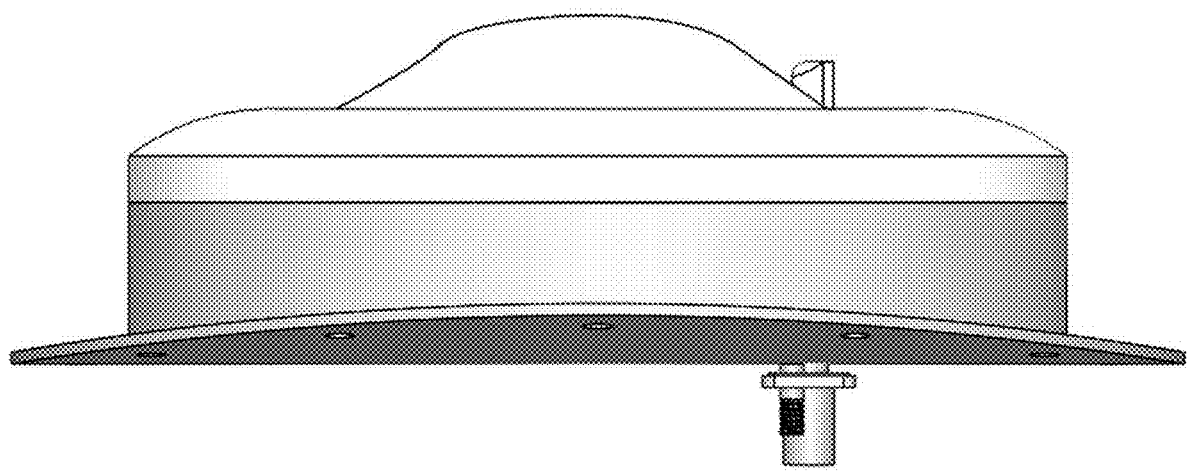
FIG. 8F is a side elevation view of the fluid mixture nozzle assembly shown in FIG. 8C, with the opposing side view being a mirror image thereof.
Figure 8G:
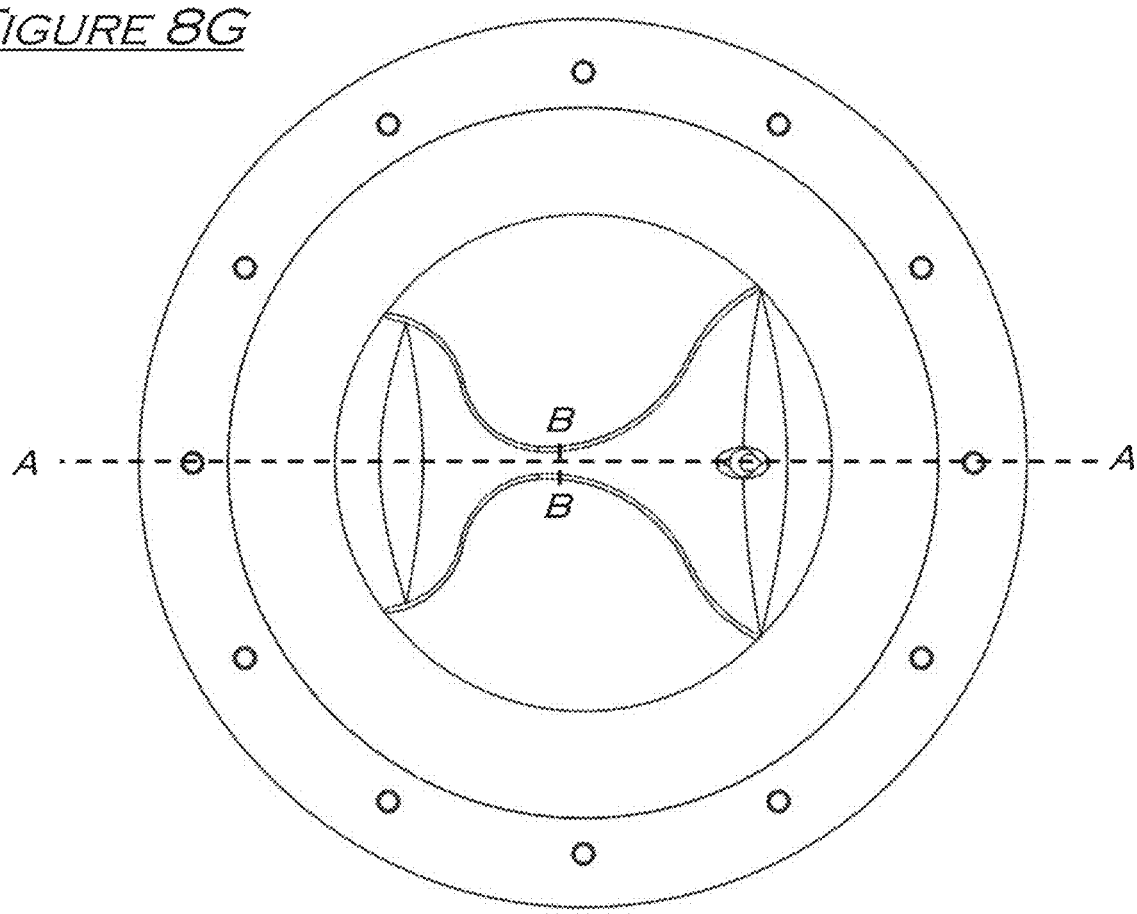
FIG. 8G is a top plan view of the fluid mixture nozzle assembly shown in FIG. 8C.
Figure 8H:
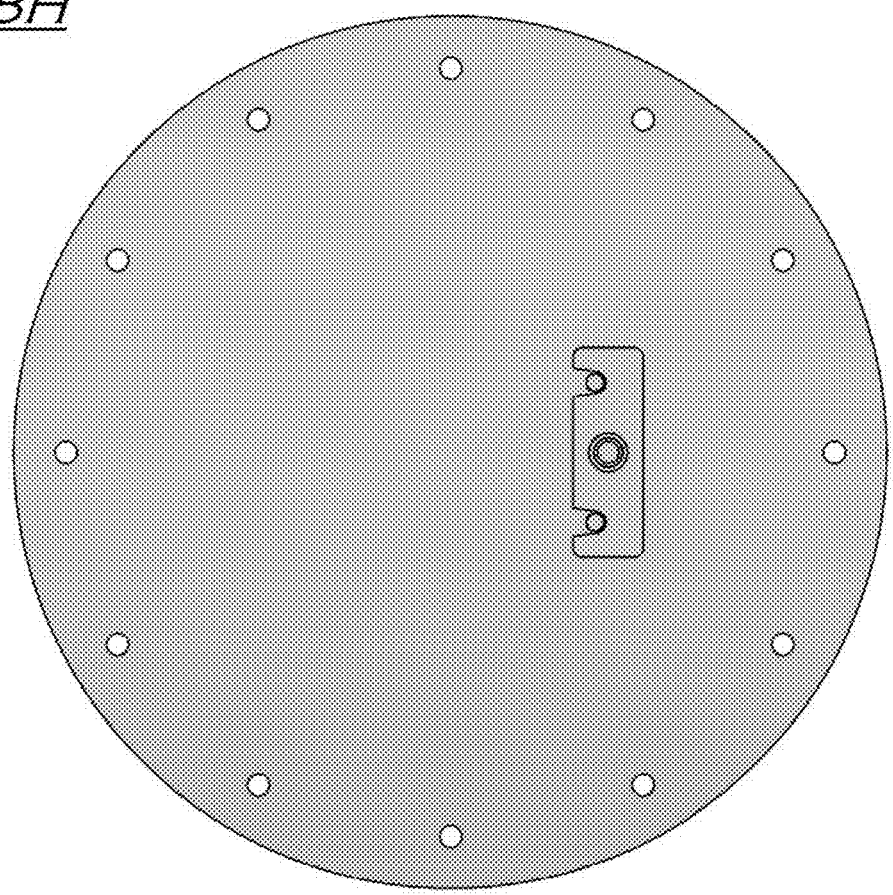
FIG. 8H is a bottom plan view of the fluid mixture nozzle assembly shown in FIG. 8C.
Figure 8I:
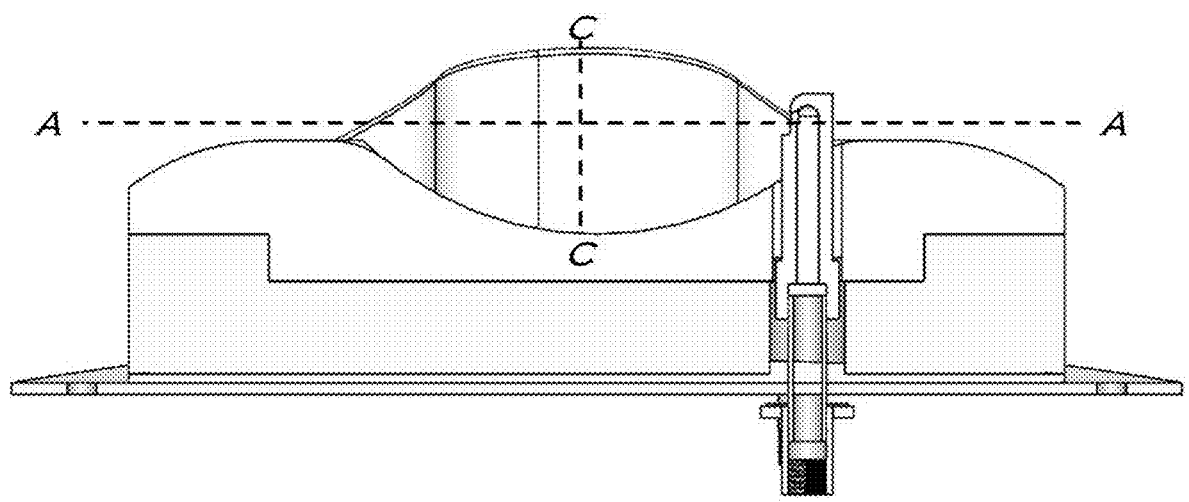
FIG. 8I is a side elevation, cross-sectional view of the fluid mixture nozzle assembly shown in FIG. 8F.
Figure 8J:
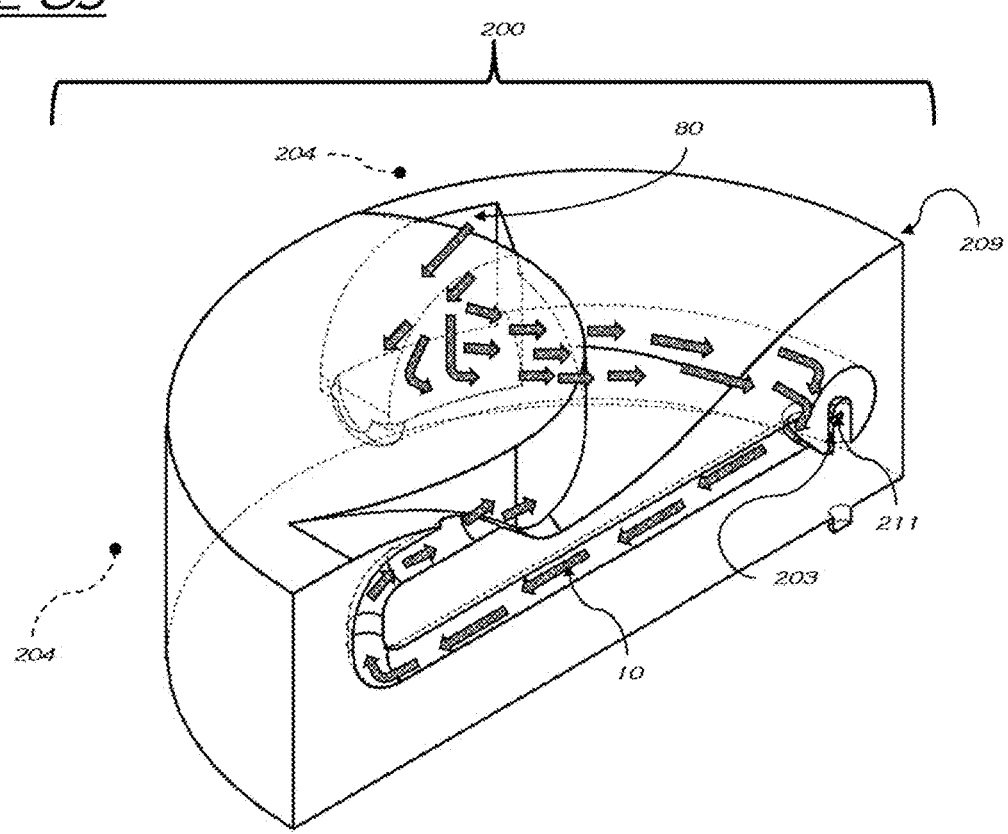
FIG. 8J is a cross-sectional and partial cutaway view of another example of a fluid mixture nozzle assembly in accordance with an illustrative embodiment of the invention disclosed herein.

FIG. 8J shows a cross-sectional and partial cutaway view of another exemplary embodiment of the fluid mixture nozzle assembly 200 where the fluid conduit is separated from the radiant section 102, but internal to the assembly 200. As can be seen, the flue gas 204 is drawn into the assembly through openings in the assembly 80 by the motive force of the primary fluid 203. This embodiment is advantageous in that the suction pressure at the opening 80 further encourages the jet spread of the mixture of the primary 203 and secondary 204 fluid by the exit of the assembly 209. Additionally, the primary fluid nozzle 211 is entirely shielded from the radiation inside the heater 100.

Each of the fluid mixture nozzle assemblies 200 is configured to inject the primary fluid mixture 203 at a target rate. The target rate can be configured such that all oxidants required for stoichiometric combustion plus any additional oxidant required to complete combustion due to imperfect mixing are metered through the burner(s) 110; or alternatively, a portion, all, or none of the primary fluid mixture 203 can be metered at the target rate through the burner(s) 110 that is installed remotely from the fluid mixture nozzle assemblies 200. As such, the fluid mixture nozzle assemblies 200 can deliver the primary fluid mixture 203 to the firebox 102 at the target rate that results in a desired fuel-to-air ratio by delivering all of the oxidant and part or none of the primary fluid mixture 203 through the burner(s) 110 and delivering the remaining portion of the fluid mixture 203 through the fluid mixture nozzle assemblies 200 remote to the burners 110 and external to the heater 100. The determination of whether the primary fluid mixture 203 should be delivered to the fluid mixture nozzle assemblies 200 is electronically regulated by a control circuit that uses measured values of oxygen, temperature, or both.

Each of the fluid mixture nozzle assemblies 200 supplies the primary fluid mixture 203, which may be fractionally or entirely fuel, via a primary fluid jet 211 at a higher pressure than the surrounding secondary flue gas 203. The fluid mixture nozzle assemblies 200 mix the primary fluid mixture 203 with the secondary fluid mixture 204 in an open mixing channel 205 of the assembly body 201. The open mixing channel 205 includes an upstream converging section 206 having the primary fluid jet 211 positioned therein, a midstream mixing section 207 that is neither contracting nor expanding, and a downstream diverging section 208. The primary fluid mixture 203 entrains the secondary vitiated flue gas 204 in the open mixing channel 205, and the momentum of the primary fluid mixture 203 from the primary fluid jet 211 directs the fluid mixture 203 and any entrained secondary fluid mixture 204 through the open mixing channel 205.

A curved lower or jet impingement surface 210 disposed downstream of the primary fluid jet 211 in the upstream converging section 206 forms in a first dimension B-B the midstream mixing section 207. The mixing section 207 further mixes the fluid mixtures 203 and 204, and the downstream diverging section 208 then decelerates and further mixes the entrained primary and secondary fluid mixtures 203 and 204. In addition, as the fluid mixtures 203 and 204 travel through the open mixing channel 205, the entrained fluid mixtures 203 and 204 follow the curved lower surface 210, which controls the adherence of the fluid flow to the surface 210 of the fluid mixture nozzle assembly 200. The open mixing channel 205 then in a second dimension C-C follows the lower curved surface 210 increasing in dimension away from the primary jet injection axis A-A as the dimension of the diverging section 208 increases. The expansion shape of the diverging section 208 shapes the entrained fluid mixtures 203 and 204 into a principally planar jet at an exit 209 of the diverging section 207. An edge of the exit 209 of the diverging section 207 can be flush with or offset from the wall 104 of the firebox 102 in which the nozzle assembly 200 is installed to further control the near-wall velocity of the fluid mixtures 203 and 204 exiting the fluid mixture nozzle assembly 200.

For most applications, it is further advantageous that the diverging section 208 be overexpanded relative to a natural round jet expansion so that additional secondary vitiated flue gas 203 is drawn into the diverging section 208 of the fluid mixture nozzle assembly 200 and entrained with the primary fluid mixture 203. The invention maintains the primary fluid mixture 203 to the secondary vitiated flue gas 203 fluid entrainment efficiency near to or greater than that of a round jet placed at a similar distance to a constraining surface. The open mixing channel 205 of the fluid mixture nozzle assembly 200 reduces the effect of the mixing channel 207 throat dimension as a constraint on the amount of vitiated flue gas 204 that may be mixed with the primary fluid mixture 203. Additionally, secondary vitiated flue gas mixture 204 may be pulled into the primary fluid mixture 203 from the curved surface 210 as the primary fluid mixture 203 and the entrained secondary flue gas 203 proceed axially away from the primary fluid jet 211.

The subsequent expansion of the fluid mixture 203 from a round jet into a planar jet educes more vitiated combustion products 203 into the fluid mixtures 203 and 204. The surface area of the planar jet is about 1.78 times greater than a round jet within the first meter of issuing from the nozzle assembly 200. This additional surface area increases the interfacial area between the fluid mixtures 203 and 204 and the flue gas combustion products, and thus increases the mixing rate.

With the mixing rate and entrainment increased from each nozzle assembly 200 when compared to a round jet, fewer nozzle assemblies 200 can be used to inject an equivalent amount of the primary fluid mixture 203. The primary fluid jet 211 can therefore be larger for a given entrainment length of the secondary fluid mixture 204, which alleviates the concern for debris plugging the primary fluid jet 211. By being mounted remotely in the combustion chamber from the burner(s) 110, the radiant heat from combustion to the nozzle assembly 200 is reduced thereby reducing the propensity for fuel fouling within the nozzle assembly 200 caused by high temperature.

Figure 9A:
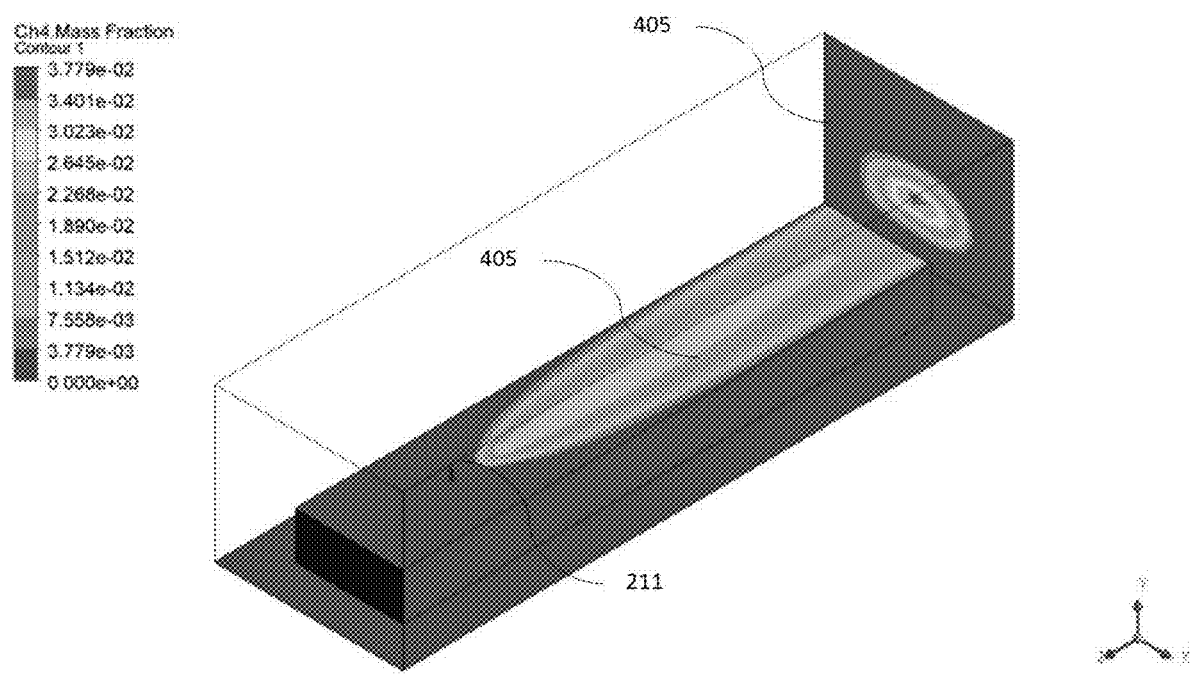
FIG. 9A is a computer simulation of the jet expansion from a prior art burner nozzle with an unconstrained round orifice placed near a wall.
Figure 9B:
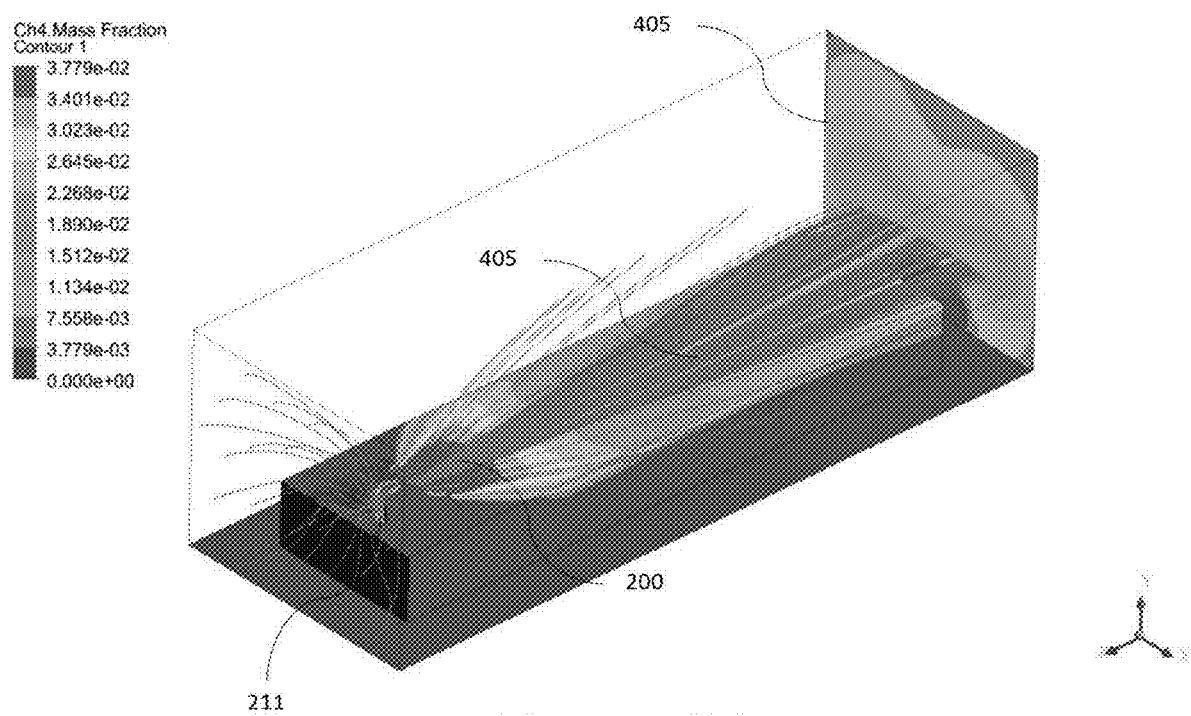
FIG. 9B is a computer simulation of the jet expansion from the fluid mixture nozzle assembly disclosed herein placed near a wall.

Moreover, the rapid expansion of the fluid mixture 203 from the nozzle assemblies 200 reduces the velocity in kind. The reduced velocity makes the invention disclosed herein suitable for installation close to a wall. If the velocity needs to be further reduced, the dimension of the exit 209 of the planar jet to the wall 104 can be increased to further reduce the velocity of the impinging jet on the nearby wall. FIGS. 9A and 9B show the result of a computer simulation used to compare a round jet 211 mounted near a wall 405 (FIG. 9A) and the fluid mixing nozzle assembly 200 mounted near a wall 405 (FIG. 9A). For both simulations, methane at a pressure of 1.4 bar gage is injected through the primary fluid jet 211 parallel to the wall 405, and in FIG. 9B, the injected methane passes through the mixing nozzle assembly 200. For both simulations, an iso-surface of 0.05 mass fraction of methane is shown to demonstrate the expansion, mixing, and dissipation of the primary fluid jet 211. The round jet iso-surface 405 appears conical with a slight deformation as it engages the nearby wall 405. The iso-surface 405 does not dissipate before the end of the assembly wall 405 approximately 1.5 meters away from the injection point. In contrast, the fluid mixing nozzle assembly 200 dissipates the methane to a concentration of less than 0.05 mass fraction within 0.5 m as shown by the corresponding iso-surface 407.

Figure 10:
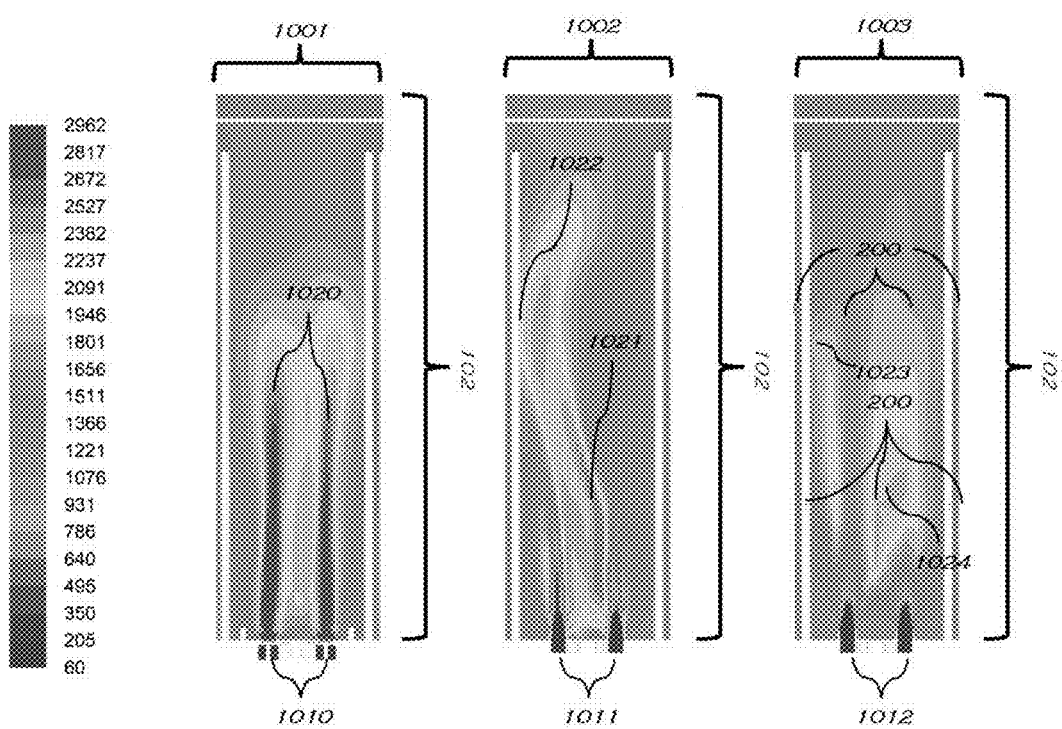
FIG. 10 is a flue gas temperature (° F.) profile comparison of a prior art burner nozzle, an ultra-low $NO_x$ burner nozzle, and the fluid mixture nozzle assembly disclosed herein.

FIG. 10 illustrates the gas temperature in degrees Fahrenheit plotted on a surface placed at the centerline of the radiant section 102 from three (3) simulations. In simulation 1001, burners 1010, where the fuel and a portion of the combustion air are premixed, fire into the radiant section 102. The rate of the initial combustion reactions is not limited by the mixing rate of the fuel and air and so the combustion proceeds rapidly resulting in a high flame temperature at the central axis 1020 of each burner 1010. In simulation 1002, the same radiant section 102 has the premix burners 1010 replaced with ultra-low NOx burners 1011. The ultra-low NOx burners 1011 stage a large portion of the fuel into the flue gas resulting in a reduced flame temperature 1021. The reduced flame temperature 1021 in turn reduces the reaction rate of the fuel such that not all of it is consumed before the flame contacts the heater tubes 1022. In simulation 1003, the nozzle assemblies 200 entrain sufficient flue gas such that the reaction temperature is well below that of flame near the tubes 1023. There is still a region of peak flame temperature 1024 near the center of the radiant section 102 where the mixture of flue gas and fuel contact relatively undiluted air. The peak flame temperature in region 1024 of simulation 1003 is still lower than that of the conventional premix burners 1020 of simulation 1001 or the ultra-low NOx burners 1011 of simulation 1002.

Figure 11:
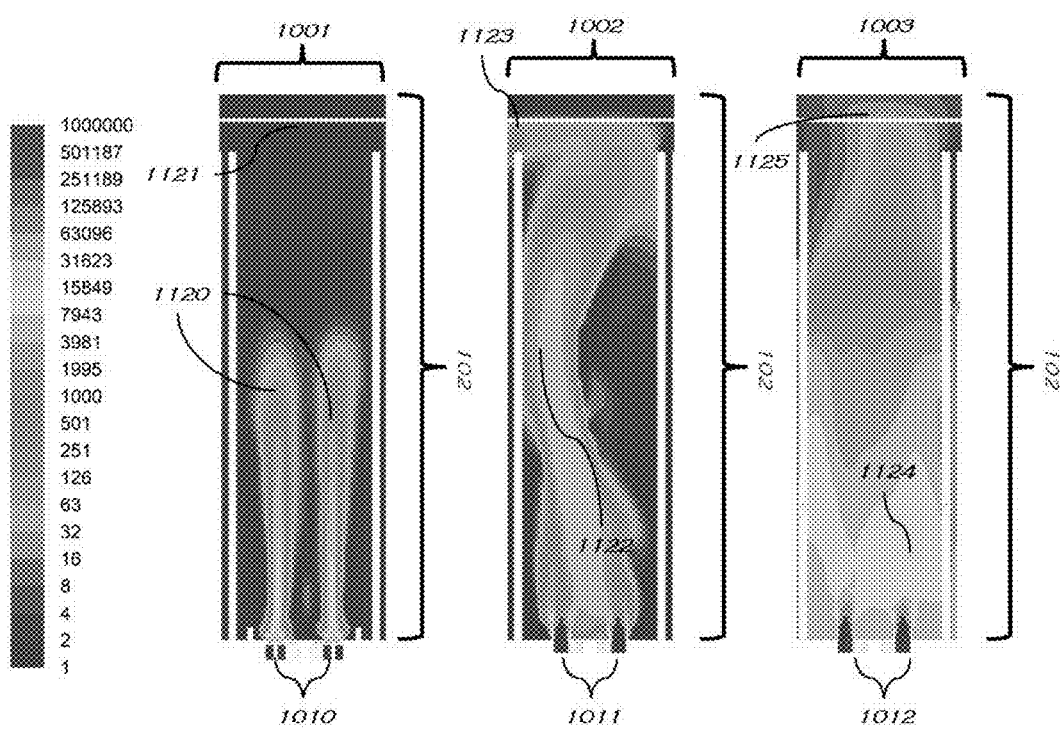
FIG. 11 is a carbon monoxide (ppm dry) comparison of a prior art burner nozzle, an ultra-low $NO_x$ burner nozzle, and the fluid mixture nozzle assembly disclosed herein.

FIG. 11 illustrates carbon monoxide plotted on a log scale in parts-per-million (dry) on a plane at the radiant section 102 centerline from the same simulations 1001, 1002, and 1003. Reduced temperature combustion reduces the reaction rate. Carbon monoxide is a partial product of hydrocarbon combustion that exists in significant quantities within the flame. When there is no carbon monoxide the combustion reactions are usually considered complete. The flame 1120 of the premix burner 1010 is completely contained within a volume that lies on the axis from which the reactants issue from the burner 1010. There is no carbon monoxide left to be combusted by the exit 1121 of the radiant section 102. In simulation 1002, the flames of the ultra-low NOx burners 1011 merge into a single flow structure 1122 that projects to the shock tubes 1123 of the radiant section 102. The simulation 1003 shows that a large volume of carbon monoxide is generated near the bottom of the radiant section 102 where the diluted fuel meets the airstream but is consumed to the 32-ppm level by the shock tubes 1123. While the reaction rate with the nozzle assemblies 200 in simulation 1003 is suppressed partial combustion products that are essentially eliminated by the exit 1125 of the radiant section 102.

Figure 12:
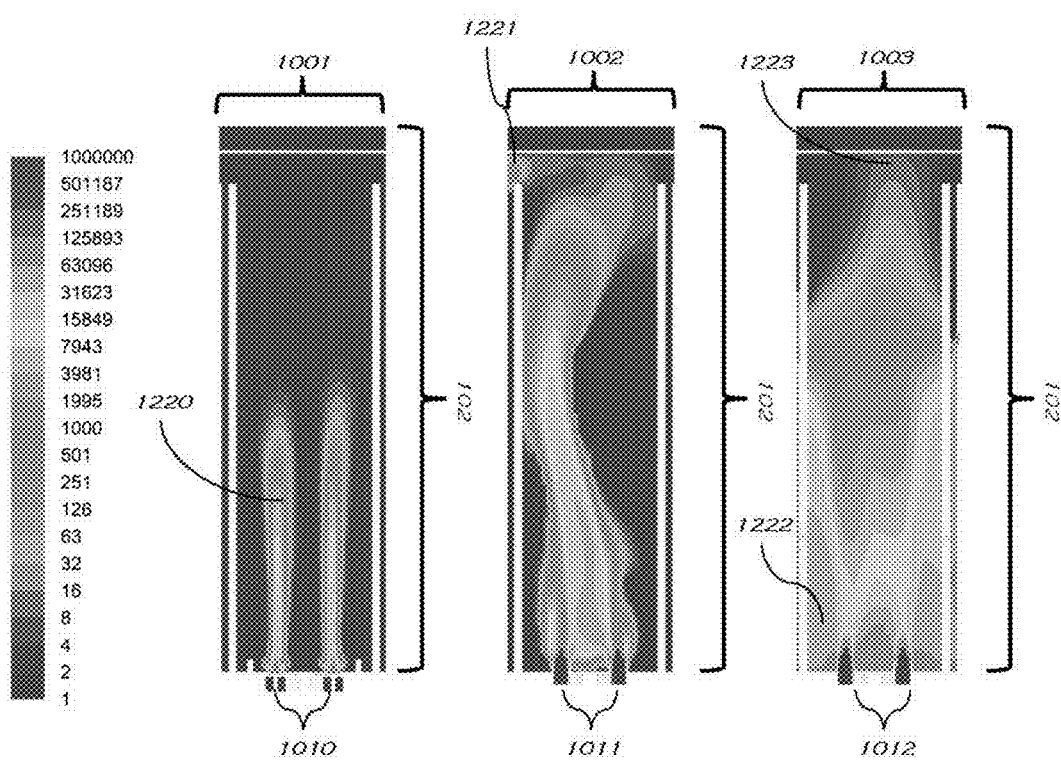
FIG. 12 is an un-burnt hydrocarbon (UBHC) (ppm dry) comparison of a prior art burner nozzle, an ultra-low $NO_x$ burner nozzle, and the fluid mixture nozzle assembly disclosed herein.

FIG. 12 illustrates unburned hydrocarbons on a log scale in parts-per-million from the simulations 1001, 1002, and 1003. The fuel from the premixed burners 1010 is quickly consumed while that from the ultra-low NOx burners 1011 still exists in significant quantity at the shock tubes 1221. With the inventive nozzle assemblies 200 installed, the unburned hydrocarbon is intentionally in significant quantity near the bottom 1222 of the radiant section 102 but is oxidized before reaching the shock tubes 1223. Although the nozzle assemblies 200 reduce the rate of reaction, all fuel is burned before the exit 1223 of the radiant section 102, and more fuel is burned in this case than when using ultra-low NOx burners 1011 with a higher combustion temperature due to inadequate mixing.

Figure 13:
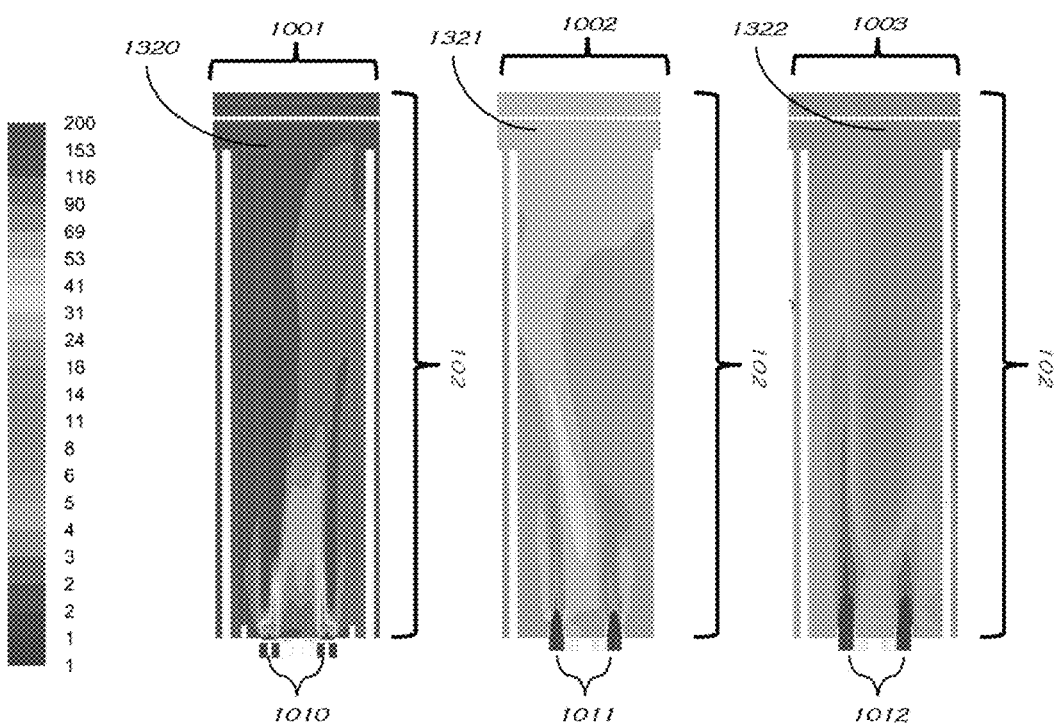
FIG. 13 is a mole fraction oxygen (02) (dry) comparison of a prior art burner nozzle, an ultra-low $NO_x$ burner nozzle, and the fluid mixture nozzle assembly disclosed herein.

FIG. 13 illustrates predicted NOx plotted in parts-per-million on a log scale. The desirable result of reducing the reaction rate and concurrently the peak temperature of the reaction is shown in the relative $NO_x$ production. When using conventional premix burners 1010 the cumulative $NO_x$ at the exit 1320 of the radiant section 102 is between about 153 ppm and about 200 ppm. When using ultra-low NOx burners 1011, the cumulative $NO_x$ at the exit 1321 of the radiant section 102 is between about 24 ppm and about 31 ppm. When using the inventive nozzle assemblies 200, the $NO_x$ is reduced to between about 8 ppm and about 14 ppm by the exit 1322 of the radiant section 102.

Figure 14:
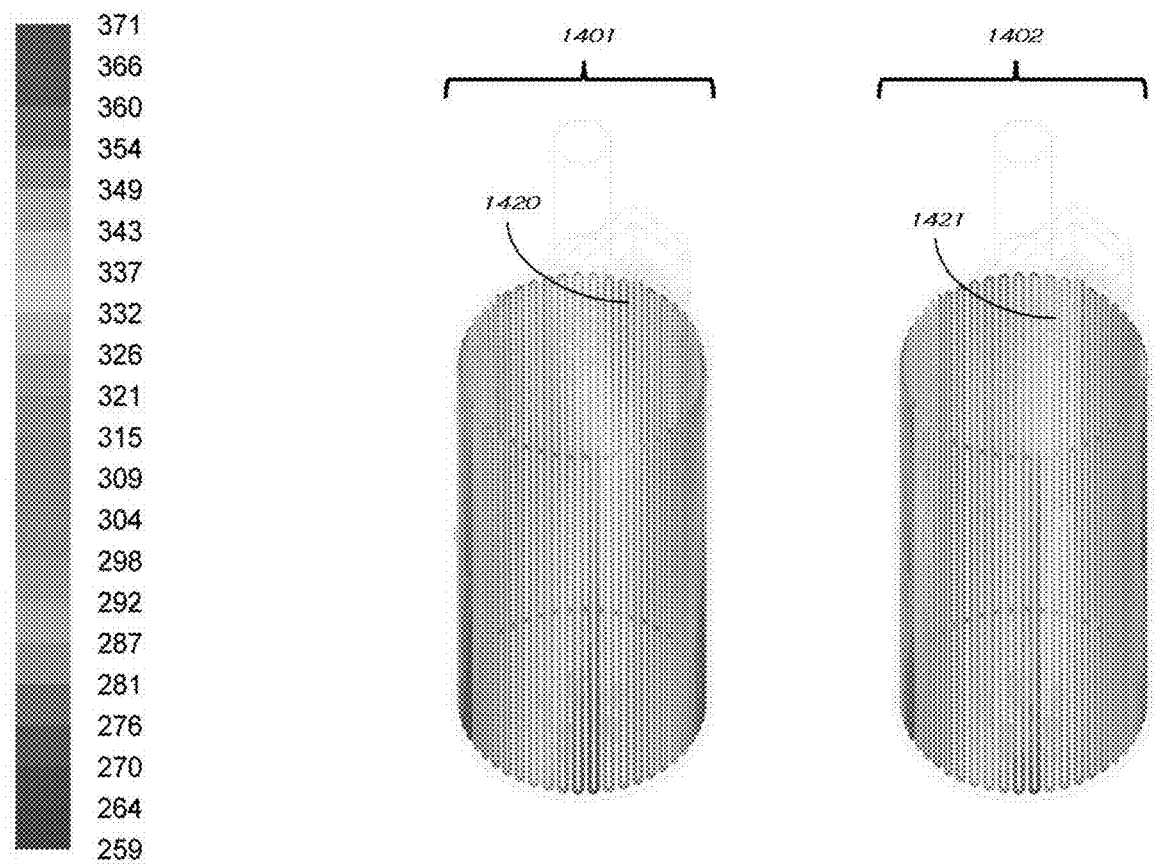
FIG. 14 is a $NO_x$ (ppm dry) comparison of a prior art burner nozzle, an ultra-low $NO_x$ burner nozzle, and the fluid mixture nozzle assembly disclosed herein.

FIG. 14 illustrates the predicted tube metal temperature in degrees Celsius for simulations 1401 and 1402, with simulation 1401 using combustion issuing from premix burners and simulation 1402 using the fluid mixture nozzle assemblies 200. By releasing the heat of combustion within the radiant section 102 more uniformly, more of the radiant coil tube surface area 1420/1421 is effectively utilized for heat transfer. The total heat transferred in both simulations 1401 and 1402 is similar but the peak tube metal temperature near the outlet of the radiant coil 1420 when using burners to supply heat is about 30 degrees Celsius higher than the peak tube temperature of the radiant coil surface area 1421 when using the nozzle assemblies 200.

Figure 15:
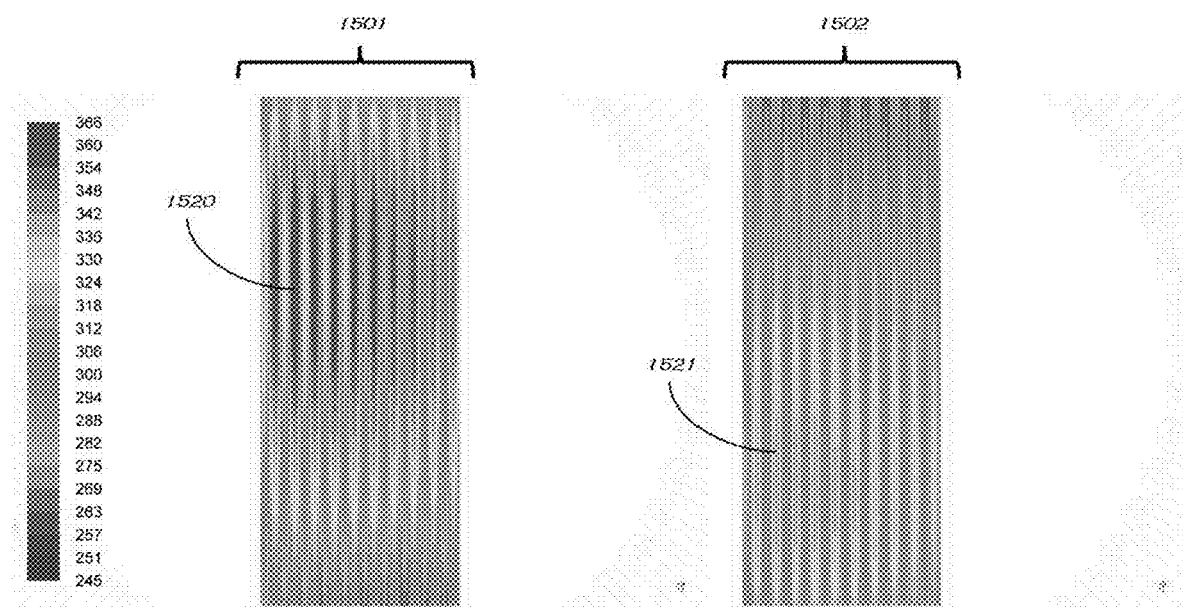
FIG. 15 is a tube wall temperature (° F.) comparison of a prior art burner nozzle, an ultra-low $NO_x$ burner nozzle, and the fluid mixture nozzle assembly disclosed herein.

FIG. 15 illustrates the predicted shock tube temperature from a simulation 1501 operated with burners and with 40% of the heat supplied by burners and a simulation 1502 operated with 60% of the heat provided by the nozzle assemblies 200. Despite the same total heat input into the furnace, the peak shock tube temperature 1521 when using the nozzle assemblies 200 is about 27 degrees Celsius lower than the peak shock tube temperature 1520 when using burners alone.

Figure 16:
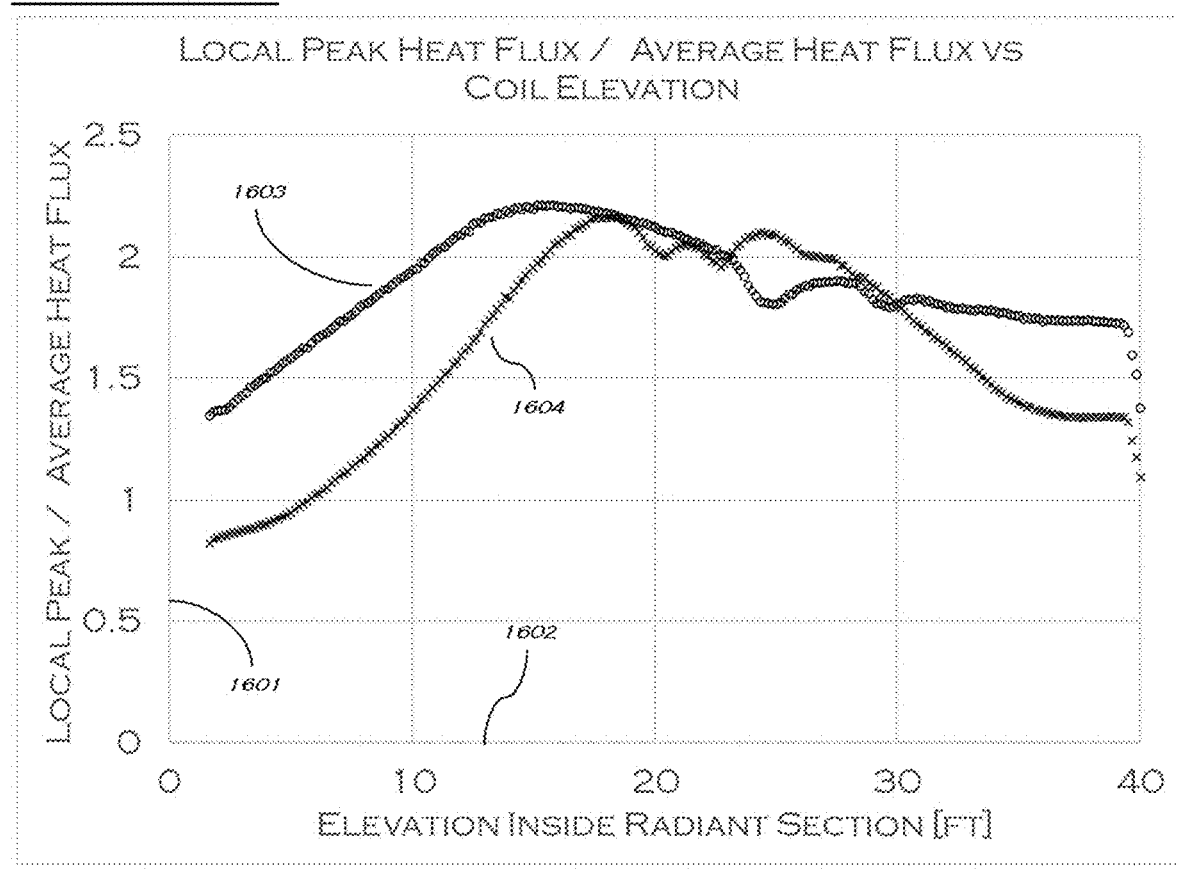
FIG. 16 is an active combustion zone (oxygen weighted CO) comparison of a prior art burner nozzle, an ultra-low $NO_x$ burner nozzle, and the fluid mixture nozzle assembly disclosed herein.

FIG. 16 graphically shows the simulated heat flux on the outlet tube of a furnace coil. The y-axis 1601 is the measured flux divided by the average heat flux over the same tube. The x-axis 1602 is the elevation of the measurement point on the simulated coil inside the radiant section of the heater. The data points represented by circles 1603 show this measure of peak-to-average ratio given operation on ultra-low $NO_x$ burners. The data points represented by 'x' 1604 show this measure of peak-to-average ratio when using the nozzle assembly 200 with about 44% more absorbed heat. It can be seen that despite the increased heat flux rate into the tube, the peak-to-average flux ratio remains lower at 2.15 than that when operating on burners alone at 2.22. Additionally, at the outlet of the tube from the 35-40 ft elevation, the peak-to-average flux ratio given the nozzle assembly 200 is about 23% lower than when operating on burners alone. This means that at the highest temperature point of the process flow that is most prone to fouling, the peak-to-average flux ratio, is reduced. This reduction then reduces the propensity for process fouling as well as the exceedance of acceptable tube metal temperatures.

The inventive method and assembly can also include a control circuit to signal whether a portion of the fuel gas is diverted from the burner(s) 110. The control circuit may use a measurement of oxygen from the vitiated combustion products 203 to calculate the state of a permissive to determine whether fuel gas should be diverted to the mixing nozzle assemblies 200. The control circuit may also use a measurement of temperature to calculate the state of a permissive to determine whether fuel should be diverted to the same mixing nozzle assemblies 200. The control circuit can measure the oxygen content and/or temperature upstream or near the mixing nozzle assembly 200 to determine whether the nozzle assembly 200 will have the primary fluid mixture 203 delivered based on the calculated minimum oxygen concentration of the fuel.

Figure 17:
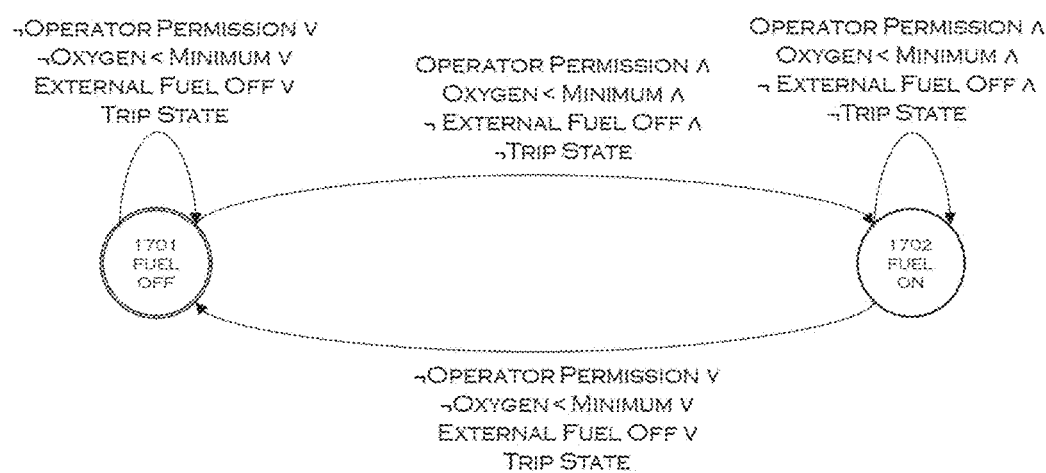
FIG. 17 is a finite state machine diagram for an example of control logic for a process of operating a fluid mixture nozzle assembly based on a measurement of oxygen in accordance with an illustrative embodiment of the invention disclosed herein.

FIG. 17 shows one state diagram exemplifying the control of the addition of fuel to the mixing nozzle assemblies 200. This control logic is in addition to any control logic used to control fuel flow to the burner(s) 110 of the fired heater 100. The control circuit regulating the fuel flow to the mixing nozzle assemblies 200 begins in the start state 1701 with the fuel flow turned off. If the operator does not provide permission, the oxygen is not less than a maximum oxygen threshold, or the fired heater 100 is in a trip state, the system returns to start state 701. If the operator provides permission, the oxygen is less than a maximum, and the heater 100 is not in a trip state, then the system transitions to a state 1702, which allows fuel flow to the mixing nozzle assemblies 200. Once in the system state 1702 allowing fuel flow to the mixing nozzle assemblies 200, if there is operator permission, the oxygen is less than the maximum oxygen threshold, and the heater 100 is not in a trip state, the system returns to the 'fuel on' state 1702. If the operator removes permission, the oxygen is not less than the maximum required threshold, or the heater is in a trip state, the system returns to the 'fuel off' state 1701, and fuel flow to the mixing nozzle assemblies 200 is ceased.

Figure 18:
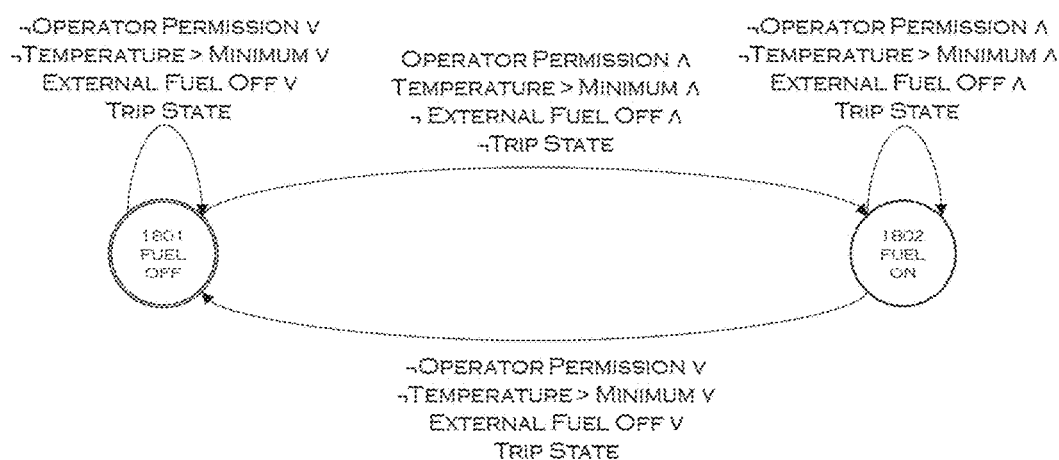
FIG. 18 is a finite state machine diagram for an example of control logic for a process of operating a fluid mixture nozzle assembly based on a measurement of temperature in accordance with an illustrative embodiment of the invention disclosed herein.

FIG. 18 shows a state diagram that possibly independently controls the addition of fuel to the mixing nozzle assemblies 200. This control logic is in addition to any control logic used to control fuel flow to the fired heater. In this embodiment, the control circuit regulating the fuel flow to the mixing nozzle assemblies 200 begins in the start state 1801 with the fuel flow turned off. If an operator does not provide permission, the temperature is not greater than a minimum temperature threshold, or the fired heater 100 is in a trip state, the system returns to start state 1801. If the operator provides permission, the temperature is greater than the minimum, and the heater 100 is not in a trip state, then the system transitions to a state 1802 which allows fuel flow to the mixing nozzle assemblies 200. Once in the state allowing fuel flow to the mixing nozzle assemblies 200, if there is operator permission, the temperature is greater than the minimum oxygen threshold, and the heater 100 is not in a trip state, the system returns to the 'fuel on' state 1802. If the operator removes permission, the oxygen is not less than the minimum required threshold, or the heater 100 is in a trip state, the system returns to the 'fuel off' state 1801, and fuel flow to the mixing nozzle assemblies 200 is ceased.

It is to be understood that the terms "including", "comprising", "consisting", and grammatical variants thereof do not preclude the addition of one or more components, features, steps, integers, or groups and that the terms are to be construed as specifying components, features, steps or integers.

If the specification or claims refer to "an additional" element, that does not preclude there being more than one of the additional elements.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

It is to be understood that were the specification or claims refer to relative terms, such as "front," "rear," "lower," "upper," "horizontal," "vertical," "above," "below," "up," "down," "top," "bottom," "left," and "right" as well as derivatives thereof (e.g., "horizontally," "downwardly," "upwardly" etc.), such reference is used for the sake of clarity and not as terms of limitation and should be construed to refer to the orientation as then described or as shown in the drawings under discussion. These relative terms are for convenience of description and do not require that the assembly be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

Where applicable, although state diagrams, flow diagrams, or both may be used to describe embodiments, the invention is not limited to those diagrams or the corresponding descriptions. For example, flow need not move through each illustrated box or state, or in the same order as illustrated and described.

Methods of the instant disclosure may be implemented by performing or completing manually, automatically, or a combination thereof, selected steps or tasks.

The term "method" may refer to manners, means, techniques, and procedures for accomplishing a given task including, but not limited to, those manners, means, techniques, and procedures either known to or readily developed from known manners, means, techniques and procedures by practitioners of the art to which the invention belongs.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Thus, the invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A fluid mixture nozzle assembly, comprising:
    a fluid mixture nozzle assembly body disposed in fluid communication with a radiant section of a fired heater; wherein the fluid mixture nozzle assembly is installed in the fired heater at a location removed from a location of a burner installed in the radiant section of the fired heater; the assembly body comprising an open mixing channel, the open mixing channel comprising:
    an upstream converging section, a midstream mixing section, and a downstream diverging section, the open mixing channel configured to mix and entrain a primary fluid mixture with a secondary fluid mixture;
    the converging section comprising a primary fluid jet positioned therein and having a primary jet injection axis along a length of the open mixing channel, the primary fluid jet configured to inject the primary fluid mixture into the open mixing channel, the converging section having a contracting shape configured to entrain and mix the primary fluid mixture with the secondary fluid mixture;
    the mixing section having neither a contracting shape nor an expanding shape, the mixing section comprising a throat dimension configured to constrain an amount of the secondary fluid mixture entrained and mixed with the primary fluid mixture;
    the diverging section having an expansion shape configured to entrain the secondary fluid mixture with the primary fluid mixture; and
    the open mixing channel further comprising a curved lower, jet impingement surface positioned downstream of the primary fluid jet in the converging section, the jet impingement surface and the diverging section configured to shape the entrained and mixed primary and secondary fluid mixtures into a principally planar jet at an exit of the diverging section.

2. The assembly of claim 1 wherein the fluid mixture nozzle assembly is configured to inject the primary fluid mixture at a target rate.

3. The assembly of claim 1 further comprising the fluid mixture nozzle assembly positioned externally from the radiant section, separated from the radiant section by an exterior heater wall, and positioned remote from the burner of the fired heater.

4. The assembly of claim 1 wherein the primary fluid jet injects the primary fluid mixture into the open mixing channel at a pressure greater than the secondary fluid mixture.

5. The assembly of claim 1 wherein the primary fluid mixture is a mixture of fuel gas and flue gas.

6. The assembly of claim 1 wherein the secondary fluid mixture is vitiated atmospheric flue gas within the fired heater.

7. The assembly of claim 1 further comprising an external fluid conduit in fluid communication with the fluid mixture nozzle assembly body, and the conduit positioned externally from the radiant section, separated from the radiant section by an exterior heater wall, and positioned remote from the burner of the fired heater.

8. The assembly of claim 7 wherein the conduit further comprises a fluid outlet, a fluid inlet, and a fluid flow path intermediate of said fluid inlet and said fluid outlet; said conduit configured to attach to the fluid mixture nozzle assembly body and the fired process heater such that the conduit fluid flow path is in fluid communication with the radiant section of the fired process heater.

9. The assembly of claim 8 wherein the conduit further comprises a flue gas entrainment unit.

10. The assembly of claim 9 wherein the flue gas entrainment unit further comprises:
    an inlet section of reducing diameter, a mixing section of constant diameter, and an exit section of expanding diameter;
    a fuel injector configured to issue fuel at subsonic, sonic, or supersonic velocity into said entrainment unit fluid flow path; and
    ductwork comprising a fluid outlet, a fluid inlet and a fluid flow path intermediate of said fluid inlet and said fluid outlet; said ductwork fluid outlet connected to said entrainment unit fluid inlet such that said ductwork fluid flow path is in fluid communication with said entrainment unit flow path; said ductwork fluid inlet configured to attach to said fired process heater such that said ductwork fluid flow path is in fluid communication with said radiant section of said fired process heater.

11. The assembly of claim 10 wherein said flue gas entrainment unit further comprises a fluid injector configured to issue a reagent fluid at subsonic, sonic, or supersonic velocity into said entrainment unit fluid flow path.

12. The assembly of claim 11 wherein said reagent fluid is steam, ammonia, urea, or a mixture thereof.

13. The assembly of claim 10 wherein said entrainment unit further comprises a thermocouple downstream of said fuel injector, a zirconia oxygen sensor downstream of said fuel injector, a tunable diode laser downstream of said fuel injector, a hot-wire anemometer, or a combination thereof.

14. The assembly of claim 10 further comprising a venturi eductor configured to attached to said entrainment unit fluid outlet and further configured to attach to said fired process heater.

15. The assembly of claim 14 wherein said venturi eductor further comprises a fluid outlet, a fluid inlet, and a fluid flow path intermediate of said fluid inlet and said fluid outlet, said venturi eductor fluid inlet connected to said entrainment unit fluid outlet such that said venturi eductor fluid flow path is in fluid communication with said entrainment unit flow path.

16. The assembly of claim 14 wherein said venturi eductor is configured to use a secondary fluid to increase the fluid flow through said flue gas entrainment unit.

17. The assembly of claim 16 wherein said secondary fluid is steam.

18. The assembly of claim 14 wherein said venturi eductor has an inlet section of reducing diameter, a mixing section of constant diameter, and an exit section of expanding diameter.

19. The assembly of claim 18 wherein said venturi eductor further comprises a fluid injector configured to issue a reagent fluid at subsonic, sonic, or supersonic velocity into said fluid flow path of said venturi eductor.

20. The assembly of claim 19 wherein said reagent fluid is steam, ammonia, urea, or a mixture thereof.

21. A fired process heater comprising a radiant section having a plurality of process tubes and a burner, said fired process heater further comprising the fluid mixture nozzle assembly of claim 1.

\* \* \* \* \*